United States Patent
Yasui et al.

[19]

[11] Patent Number: 6,026,793

[45] Date of Patent: Feb. 22, 2000

[54] CONTROL SYSTEM FOR PLANTS

[75] Inventors: Yuji Yasui; Yusuke Hasegawa; Yoshihisa Iwaki; Shusuke Akazaki; Hiroshi Kitagawa, all of Wako, Japan

[73] Assignee: Honda Giken Kogyo Kabushiki Kaisha, Tokyo, Japan

[21] Appl. No.: 09/143,542

[22] Filed: Aug. 28, 1998

[30] Foreign Application Priority Data

Aug. 29, 1997 [JP] Japan .................................. 9-247519

[51] Int. Cl.$^7$ .................................................. F02M 25/00
[52] U.S. Cl. .......................................... 123/674; 123/675
[58] Field of Search .................................... 123/674, 675

[56] References Cited

U.S. PATENT DOCUMENTS

| | | | |
|---|---|---|---|
| 5,209,214 | 5/1993 | Ikuta et al. . | |
| 5,243,952 | 9/1993 | Ikuta et al. . | |
| 5,636,621 | 6/1997 | Maki et al. . | |
| 5,638,801 | 6/1997 | Makimet | 123/674 |
| 5,701,871 | 12/1997 | Munakata et al. | 123/674 |
| 5,797,261 | 8/1998 | Akazaki et al. | 123/674 |
| 5,813,390 | 9/1998 | Anamoto | 123/674 |
| 5,816,230 | 10/1998 | Kurokawa et al. | 123/674 |
| 5,868,117 | 2/1999 | Moote et al. | 123/674 |
| 5,911,682 | 6/1999 | Kato et al. | 123/674 |

FOREIGN PATENT DOCUMENTS 0 312 835 A2  4/1989  European Pat. Off. .

*Primary Examiner*—John Kwon
*Attorney, Agent, or Firm*—Nikaido, Marmelstein, Murray & Oram LLP

[57] ABSTRACT

A control system for a plant includes a sensor for detecting an output from the plant, an adaptive controller for controlling a manipulated variable applied to control of the plant in a manner such that an output from the sensor becomes equal to a desired value, and an adaptive parameter vector-adjusting mechanism for adjusting an adaptive parameter vector used by the adaptive controller. The adaptive parameter vector-adjusting mechanism is constructed such that an updating component for updating the adaptive parameter vector is added to an initial value of the adaptive parameter vector, and updates the adaptive parameter vector by multiplying at least part of preceding values of the updating component by a predetermined coefficient which is larger than 0 but smaller than 1.

9 Claims, 13 Drawing Sheets

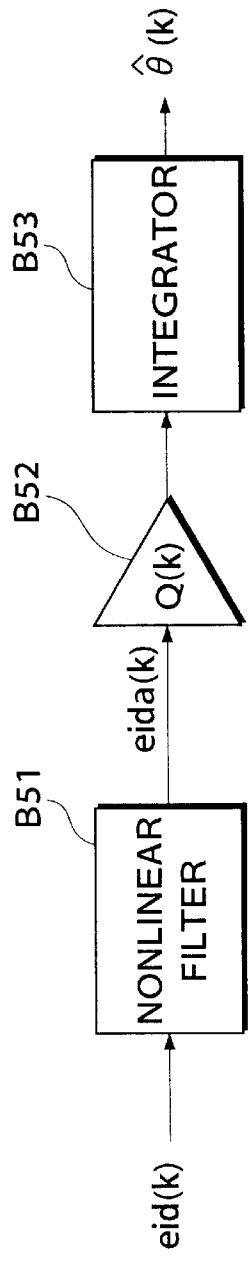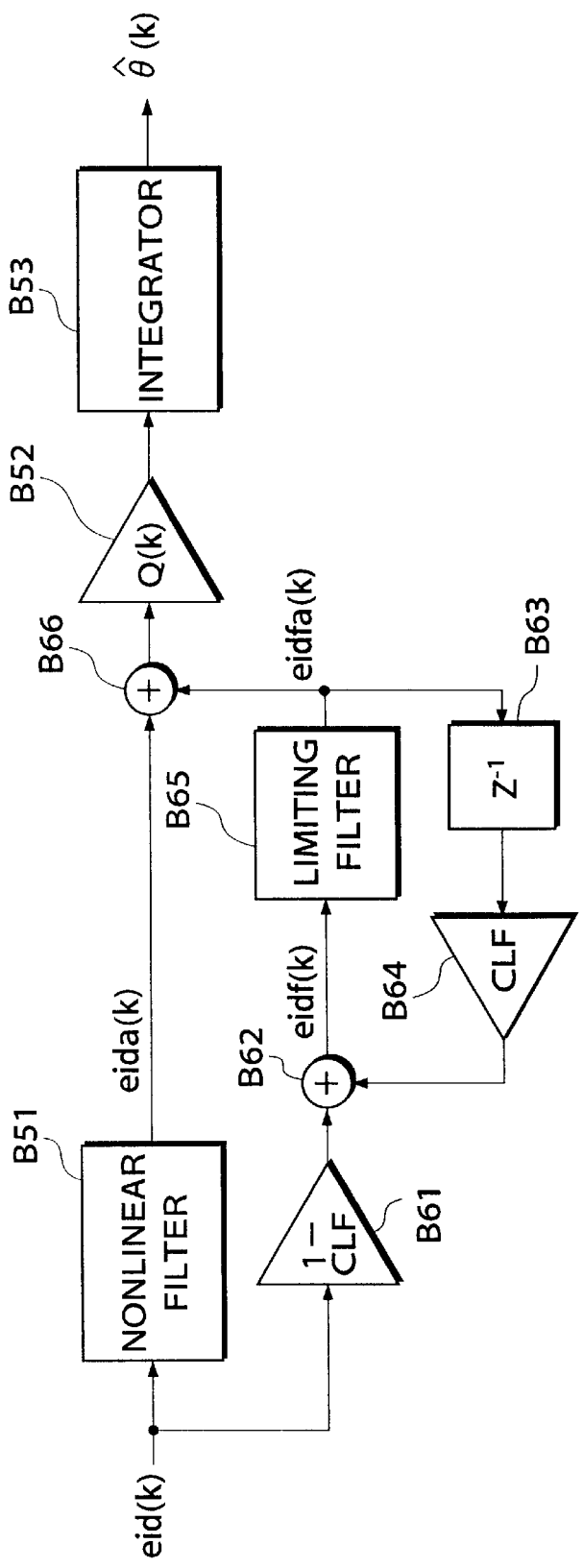

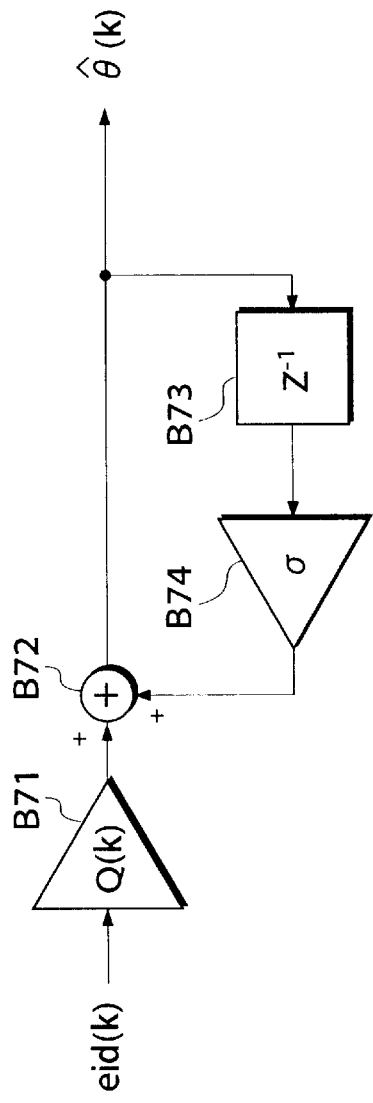
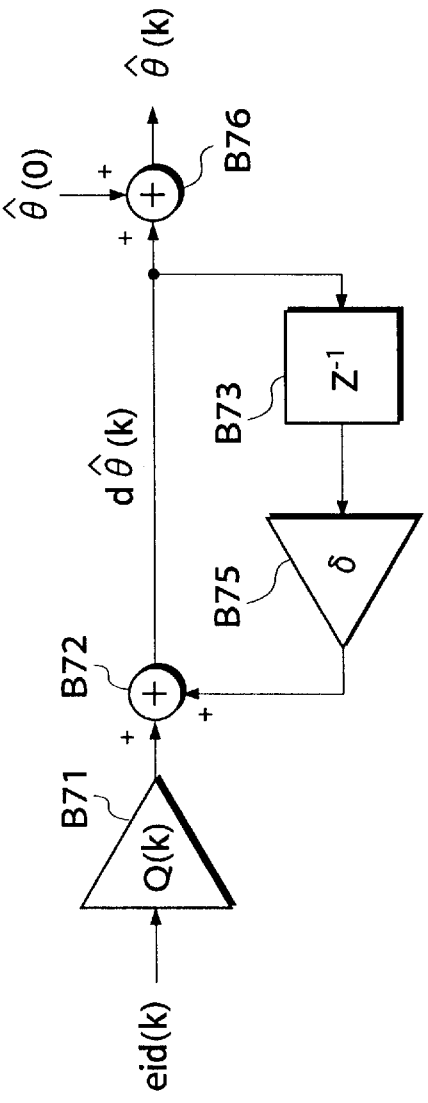
*FIG.13A*
*FIG.13B*

CONTROL SYSTEM FOR PLANTS

BACKGROUND OF THE INVENTION

1. Field of the Invention

This invention relates to a control system for plants, which controls a plant by means of feedback control based on an adaptive control theory.

2. Prior Art

Conventionally, an air-fuel ratio control system for internal combustion engines is known, e.g. from U.S. Pat. No. 5,636,621, in which a parameter-adjusting mechanism calculates adaptive parameters and an adaptive controller carries out feedback control of the air-fuel ratio of a mixture supplied to the engine to a desired air-fuel ratio by using the adaptive parameters. In the known air-fuel ratio control system, an air-fuel ratio sensor arranged in the exhaust system of the engine detects the air-fuel ratio of the mixture and supplies a signal indicative of the detected air-fuel ratio to the adaptive controller, which in turn determines an amount of fuel to be supplied to the engine such that the detected air-fuel ratio becomes equal to a desired air-fuel ratio. In this case, the internal combustion engine is a plant as an object to be controlled, while the amount of fuel to be supplied to the engine and the desired air-fuel ratio are a manipulated variable and a desired value to which an operation of the plant is to be controlled, respectively.

In the air-fuel ratio control system disclosed in the above publication, to perform the adaptive control in a stable manner, limit-checking of an identification error signal (indicative of a degree of deviation of the adaptive parameters from their optimal values) for use in calculation of the adaptive parameters by the adaptive parameter-adjusting mechanism is carried out such that the value of the signal falls within a predetermined range defined by upper and lower limit values.

However, even if the value of the identification error signal is within the predetermined range, calculation of the adaptive parameter vector $\hat{\theta}(k)$ is made by adding the product of the identification error signal e* multiplied by a predetermined gain to the immediately preceding value $\hat{\theta}(k-1)$, as shown in Mathematical Formula (8) in the above publication. Accordingly, the identification error signal e* is accumulated in the adaptive parameter vector $\hat{\theta}$ through the multiplication. Therefore, in the conventional control system, when the adaptive control is continued while the engine as the object to be controlled is in a steady and stable operating condition, it cannot be avoided that the adaptive parameter vector $\hat{\theta}$ drifts (progressively deviates from the optimal value).

SUMMARY OF THE INVENTION

It is the object of the present invention to provide a control system for plants, which is capable of preventing the adaptive parameter vector from progressively deviating from its optimal value (drifting) as time elapses, even when the adaptive control is continuously executed in a steady operating condition of the plant, to thereby enable the adaptive control to be continued in a stable manner.

To attain the above object, the present invention provides a control system for a plant, including detection means for detecting an output from the plant, an adaptive controller for controlling a manipulated variable applied to control of the plant in a manner such that an output from the detection means becomes equal to a desired value, and adaptive parameter vector-adjusting means for adjusting an adaptive parameter vector used by the adaptive controller.

The control system is characterized by an improvement wherein:

the adaptive parameter vector-adjusting means is constructed such that an updating component for updating the adaptive parameter vector is added to an initial value of the adaptive parameter vector, the adaptive parameter vector-adjusting means updating the adaptive parameter vector by multiplying at least part of preceding values of the updating component by a predetermined coefficient which is larger than 0 but smaller than 1.

Preferably, the adaptive parameter vector-adjusting means does not multiply the initial value of the adaptive parameter vector by the predetermined value.

Alternatively, the adaptive parameter vector-adjusting means multiplies the initial value of the adaptive parameter vector by the predetermined value.

Preferably, the adaptive parameter vector-adjusting means does not multiply an element of the adaptive parameter vector which is applied as a divisor term for determining the manipulated variable, by the predetermined coefficient.

More preferably, the adaptive parameter vector-adjusting means sets the element of the adaptive parameter vector to 1.

Advantageously, the adaptive parameter vector-adjusting means sets elements of the predetermined coefficient to respective predetermined values larger than 0 but smaller than 1, respectively.

Alternatively, the adaptive parameter vector-adjusting means sets elements of the predetermined coefficient to an identical predetermined value larger than 0 but smaller than 1.

Preferably, the plant is an internal combustion engine having an exhaust system, the detection means being air-fuel ratio-detecting means arranged in the exhaust system, for detecting an air-fuel ratio of an air-fuel mixture supplied to the engine, the desired value being a desired air-fuel ratio of the air-fuel mixture, the manipulated variable being an amount of fuel to be supplied to the engine.

More preferably, the manipulated variable is calculated as a correction coefficient for correcting a basic fuel amount corresponding to an amount of intake air supplied to the engine.

The above and other objects, features, and advantages of the invention will become more apparent from the following detailed description taken in conjunction with the accompanying drawings.

BRIEF DESCRIPTION OF THE DRAWINGS

FIG. 7A is a block diagram showing an adaptive parameter vector-calculating section for calculating an adaptive parameter vector according to the first embodiment;

FIG. 7B is a block diagram showing a variation of the adaptive parameter vector-calculating section;

FIG. 13A is a block diagram showing an adaptive parameter vector-calculating section for calculating the adaptive parameter vector, which is used in a control system according to a second embodiment of the invention; and FIG. 13B is a block diagram showing an adaptive parameter vector-calculating section for calculating the adaptive parameter vector, which is used in a control system according to a third embodiment of the invention.

DETAILED DESCRIPTION

The invention will now be described in detail with reference to the drawings showing embodiments thereof.

Figure 1:
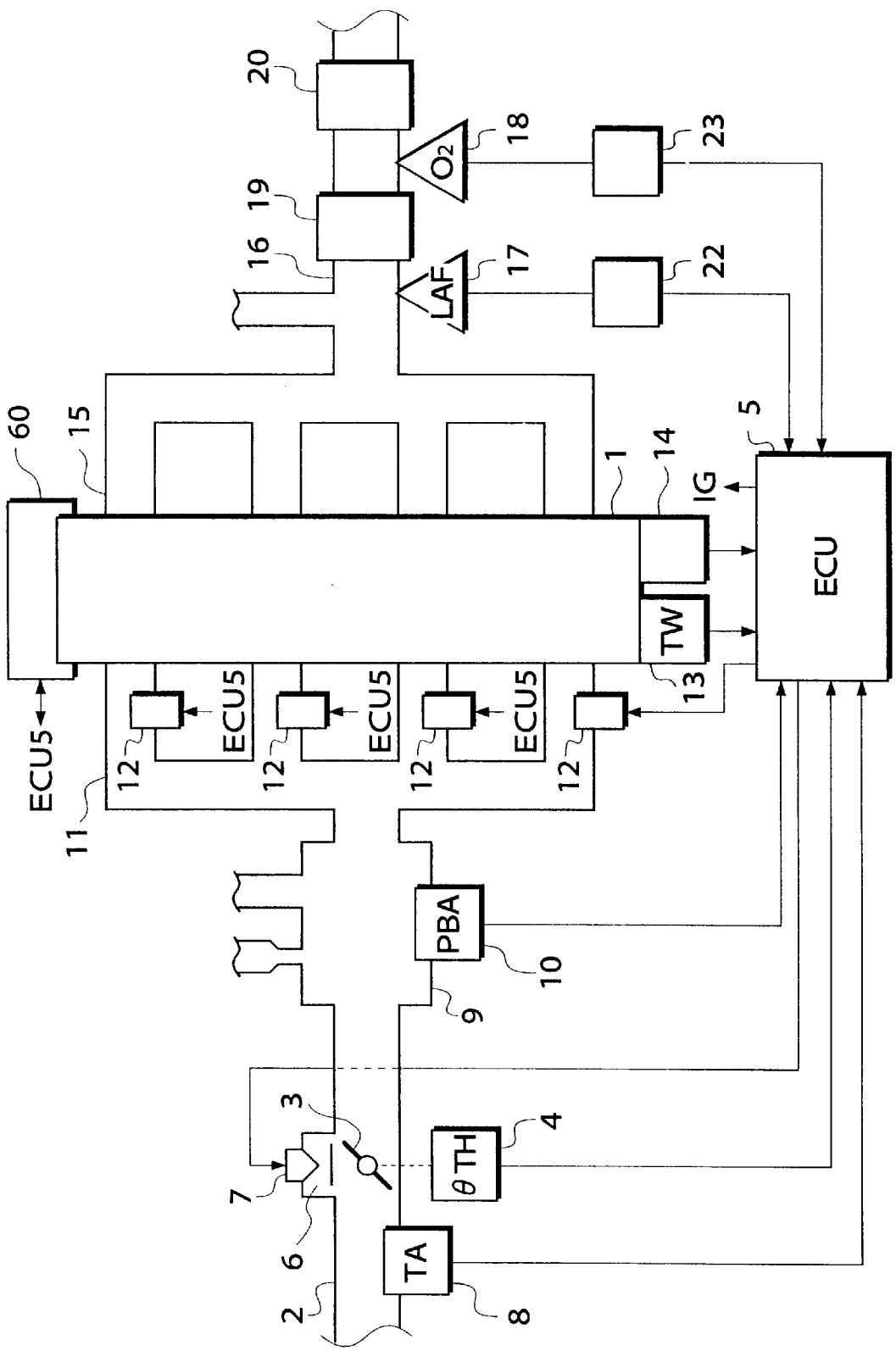
FIG. 1 is a block diagram showing the arrangement of an internal combustion engine and an air-fuel ratio control system therefor, as a plant and a control system therefor, respectively, according to a first embodiment of the invention.

FIG. 1 schematically shows the whole arrangement of an internal combustion engine (hereinafter simply referred to as the engine) and a control system therefor, as a plant and a control system for the plant, respectively, according to a first embodiment of the invention. That is, in the figure, the arrangement of the control system for the plant is shown in which the plant is embodied as the engine and a manipulated variable of the control system is embodied as the air-fuel ratio (amount of fuel) of a mixture supplied to the engine.

In FIG. 1, reference numeral 1 designates a four-cylinder type internal combustion engine. The engine 1 has an intake pipe 2 having a manifold part (intake manifold) 11 directly connected to the combustion chamber of each cylinder. A throttle valve 3 is arranged in the intake pipe 2 at a location upstream of the manifold part 11. A throttle valve opening (θTH) sensor 4 is connected to the throttle valve 3, for generating an electric signal indicative of the sensed throttle valve opening θTH and supplying the same to an electronic control unit (hereinafter referred to as the ECU) 5. The intake pipe 2 is provided with an auxiliary air passage 6 bypassing the throttle valve 3, and an auxiliary air amount control valve (electromagnetic valve) 7 is arranged across the auxiliary air passage 6. The auxiliary air amount control valve 7 is electrically connected to the ECU 5 to have an amount of opening thereof controlled by a signal therefrom.

An intake air temperature (TA) sensor 8 is inserted into the intake pipe 2 at a location upstream of the throttle valve 3, for supplying an electric signal indicative of the sensed intake air temperature TA to the ECU 5. The intake pipe 2 has a swelled portion 9 in the form of a chamber interposed between the throttle valve 3 and the intake manifold 11. An intake pipe absolute pressure (PBA) sensor 10 is arranged in the chamber 9, for supplying a signal indicative of the sensed intake pipe absolute pressure PBA to the ECU 5.

An engine coolant temperature (TW) sensor 13, which may be formed of a thermistor or the like, is mounted in the cylinder block of the engine 1 filled with an engine coolant, for supplying an electric signal indicative of the sensed engine coolant temperature TW to the ECU 5. A crank angle position sensor 14 for detecting the rotational angle of a crankshaft, not shown, of the engine 1 is electrically connected to the ECU 5 for supplying an electric signal indicative of the sensed rotational angle of the crankshaft to the ECU 5.

The crank angle position sensor 14 is comprised of a cylinder-discriminating sensor, a TDC sensor, and a CRK sensor. The cylinder-discriminating sensor generates a signal pulse (hereinafter referred to as a CYL signal pulse) at a predetermined crank angle of a particular cylinder of the engine 1, the TDC sensor generates a signal pulse at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the suction stroke of the cylinder, and the CRK sensor generates a signal pulse at each of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5, which are used for controlling various kinds of timing, such as fuel injection timing and ignition timing, and for detecting the engine rotational speed NE.

Fuel injection valves 12 are inserted into the intake manifold 11 for respective cylinders at locations slightly upstream of intake valves, not shown. The fuel injection valves 12 are connected to a fuel pump, not shown, and electrically connected to the ECU 5 to have the fuel injection timing and fuel injection periods (valve opening periods) thereof controlled by signals therefrom. Spark plugs, not shown, of the engine 1 are also electrically connected to the ECU 5 to have the ignition timing θIG thereof controlled by signals therefrom.

An exhaust pipe 16 of the engine has a manifold part (exhaust manifold) 15 directly connected to the combustion chambers of the cylinders of the engine 1. A linear output air-fuel ratio sensor (hereinafter referred to as "the LAF sensor") 17 is arranged in a confluent portion of the exhaust pipe 16 at a location immediately downstream of the exhaust manifold 15. Further, a first three-way catalyst (immediate downstream three-way catalyst) 19 and a second three-way catalyst (bed-downstream three-way catalyst) 20 are arranged in the confluent portion of the exhaust pipe 16 at locations downstream of the LAF sensor 17, for purifying noxious components present in exhaust gases, such as HC, CO, and NOx. An oxygen concentration sensor (hereinafter referred to as "the O2 sensor") 18 is inserted into the exhaust pipe 16 at a location intermediate between the three-way catalysts 19 and 20.

The LAF sensor 17 is electrically connected via a low-pass filter 22 to the ECU 5, for supplying the ECU 5 with an electric signal substantially proportional in value to the concentration of oxygen present in exhaust gases from the engine (i.e. the air-fuel ratio). The O2 sensor 18 has an output characteristic that output voltage thereof drastically changes when the air-fuel ratio of exhaust gases from the engine changes across a stoichiometric air-fuel ratio to deliver a high level signal when the mixture is richer than the stoichiometric air-fuel ratio, and a low level signal when the mixture is leaner than the same. The O2 sensor 18 is electrically connected via a low-pass filter 23 to the ECU 5, for supplying the ECU 5 with the high or low level signal. The low-pass filters 22 and 23 are provided for eliminating high frequency noise components, and influence thereof on the responsiveness of the air-fuel ratio control system is negligible.

The engine 1 includes a valve timing changeover mechanism 60 which changes valve timing of at least the intake valves out of the intake valves and exhaust valves, not shown, between a high speed valve timing suitable for operation of the engine in a high speed operating region thereof and a low speed valve timing suitable for operation of the engine in a low speed operating region thereof. The changeover of the valve timing includes not only timing of opening and closing of the valve but also changeover of the valve lift amount, and further, when the low speed valve timing is selected, one of the two intake valves is disabled, thereby ensuring stable combustion even when the air-fuel ratio of the mixture is controlled to a leaner value than the stoichiometric air-fuel ratio.

The valve timing changeover mechanism 60 changes the valve timing by means of hydraulic pressure, and an electromagnetic valve for changing the hydraulic pressure and a hydraulic pressure sensor, neither of which is shown, are electrically connected to the ECU 5. A signal indicative of the sensed hydraulic pressure is supplied to the ECU 5 which in turn controls the electromagnetic valve for changing the valve timing.

Further electrically connected to the ECU 5 is an atmospheric pressure (PA) sensor 21, for detecting atmospheric pressure PA, and supplying a signal indicative of the sensed atmospheric pressure PA to the ECU 5.

The ECU 5 is comprised of an input circuit having the functions of shaping the waveforms of input signals from various sensors including ones mentioned above, shifting the voltage levels of sensor output signals to a predetermined level, converting analog signals from analog-output sensors to digital signals, and so forth, a central processing unit (hereinafter referred to as the CPU), a memory circuit comprised of a ROM storing various operational programs which are executed by the CPU and various maps and tables, referred to hereinafter, and a RAM for storing results of calculations from the CPU, etc., and an output circuit which outputs driving signals to the fuel injection valves 12 and other electromagnetic valves, spark plugs, etc.

The ECU 5 operates in response to the above-mentioned signals from the sensors to determine operating conditions in which the engine 1 is operating, such as an air-fuel ratio feedback control region in which air-fuel ratio feedback control is carried out in response to outputs from the LAF sensor 17 and the O2 sensor 18, and air-fuel ratio open-loop control regions, and calculates, based upon the determined engine operating conditions, the fuel injection period TOUT over which the fuel injection valves 12 are to be opened, by using the following equation (1), to output signals for driving the fuel injection valves 12, based on results of the calculation:

$$TOUT = TIMF \times KTOTAL \times KCMDM \times KFB \quad (1)$$

where TIMF represents a basic value of the fuel injection amount TOUT, KTOTAL a correction coefficient, KCMDM a final desired air-fuel ratio coefficient, and KFB a feedback correction coefficient, respectively.

Figure 2:
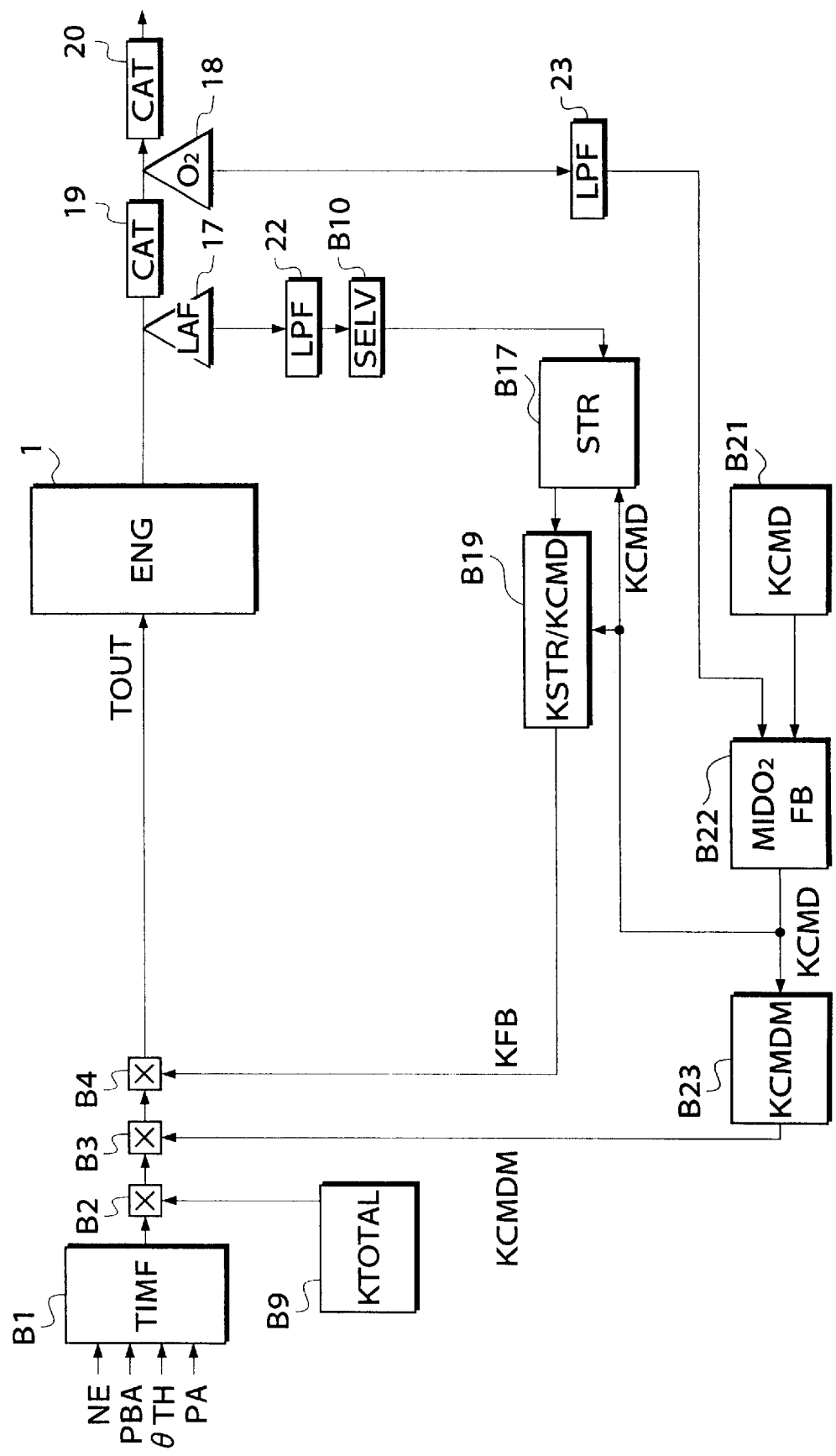
FIG. 2 is a block diagram useful in explaining a manner of controlling the air-fuel ratio of a mixture supplied to the engine appearing in FIG. 1.

FIG. 2 is a block diagram useful in explaining the manner of calculating the fuel injection period TOUT by using the equation (1). With reference to the figure, an outline of the manner of calculating the fuel injection period TOUT according to the present embodiment will be described. It should be noted that in the present embodiment, the amount of fuel to be supplied to the engine is calculated, actually, in terms of a time period over which the fuel injection valve 6 is opened (fuel injection period), but in the present specification, the fuel injection period TOUT is referred to as the fuel injection amount or the fuel amount since the fuel injection period is equivalent to the amount of fuel injected or to be injected.

In FIG. 2, a block B1 calculates the basic fuel amount (basic value of the fuel injection amount) TIMF corresponding to an amount of intake air supplied to the engine 1. The basic fuel amount TIMF is basically set according to the engine rotational speed NE and the intake pipe absolute pressure PBA. However, it is preferred that a model representative of a part of the intake system extending from the throttle valve 3 to the combustion chambers of the engine 1 is prepared in advance, and a correction is made to the basic fuel amount TIMF in dependence on a delay of the flow of intake air obtained based on the model. In this preferred method, the throttle valve opening θTH and the atmospheric pressure PA are also used as additional parameters indicative of operating conditions of the engine.

Reference numerals B2 to B4 designate multiplying blocks, which multiply the basic fuel amount TIMF by respective parameter values input thereto, and deliver the product values. These blocks carry out the arithmetic operation of the equation (1), to thereby generate the fuel injection amount TOUT.

A block B9 multiplies together all feed forward correction coefficients, such as an engine coolant temperature-dependent correction coefficient KTW set according to the engine coolant temperature TW, an EGR-dependent correction coefficient KEGR set according to the amount of recirculation of exhaust gases during execution of the exhaust gas recirculation, and a purging-dependent correction coefficient KPUG set according to an amount of purged evaporative fuel during execution of purging by an evaporative fuel-processing system of the engine, not shown, to obtain the correction coefficient KTOTAL, which is supplied to the block B2.

A block B21 determines a desired air-fuel ratio coefficient KCMD, based on the engine rotational speed NE, the intake pipe absolute pressure PBA, etc., and supplies the same to a block B22. The desired air-fuel ratio coefficient KCMD is directly proportional to the reciprocal of the air-fuel ratio A/F, i.e. the fuel-air ratio F/A, and assumes a value of 1.0 when it is equivalent to the stoichiometric air-fuel ratio. For this reason, this coefficient KCMD will be also referred to as the desired equivalent ratio. The block B22 corrects the desired air-fuel ratio coefficient KCMD based on an output VMO2 from the O2 sensor 18 supplied via the low-pass filter 23, and delivers the corrected KCMD value to blocks B17, B19 and B23. The block B23 carries out fuel cooling-dependent correction of the corrected KCMD value to calculate the final desired air-fuel ratio coefficient KCMDM and supplies the same to the block B3.

A block B10 samples the output from the LAF sensor 17 supplied via the low-pass filter 22 with a sampling period in synchronism with generation of each CRK signal pulse, sequentially stores the sampled values into a ring buffer memory, not shown, and selects one of the stored values depending on operating conditions of the engine (LAF sensor output-selecting process), which was sampled at the optimum timing for each cylinder, to supply the selected value to the block B17. The LAF sensor output-selecting process eliminates the inconveniences that the air-fuel ratio, which changes every moment, cannot be accurately detected depending on the timing of sampling of the output from the LAF sensor 17, there is a time lag before exhaust gases emitted from the combustion chamber reach the LAF sensor 17, and the response time of the LAF sensor per se changes depending on operating conditions of the engine.

The block B17 calculates an adaptive control correction coefficient KSTR by the operation of an adaptive controller (Self-Tuning Regulator) incorporated therein, based on the air-fuel ratio detected by the LAF sensor 17, and delivers the calculated KSTR value to the block B19. The reason for employing the adaptive control is as follows: If the basic fuel amount TIMF is merely multiplied by the desired air-fuel ratio coefficient KCMD (KCMDM), the resulting desired air-fuel ratio and hence the actual air-fuel ratio may become dull due to a response lag of the engine. The adaptive control is employed to dynamically compensate for the response lag of the engine to thereby improve the robustness of the air-fuel ratio control against external disturbances. The block B19 divides the adaptive control correction coefficient KSTR by the desired air-fuel ratio coefficient KCMD to thereby calculate the feedback correction coefficient KFB, and delivers the calculated KFB value to the block 4. The dividing process is carried out to prevent the basic fuel amount TIMF from being doubly multiplied by a factor representative of the desired air-fuel ratio coefficient KCMD, since the adaptive control correction coefficient KSTR is calculated such that the actual equivalent ratio KACT becomes equal to the desired air-fuel ratio coefficient KCMD, and hence it includes a factor corresponding to the desired air-fuel ratio coefficient KCMD.

According to the present embodiment, as described above, the adaptive control correction coefficient KSTR calculated through the adaptive control responsive to the output from the LAF sensor 17 is divided by the desired air-fuel ratio coefficient KCMD and the resulting quotient is applied as the correction coefficient KFB to the equation (1) to calculate the fuel injection amount TOUT. When the correction coefficient KSTR is thus applied, the responsiveness of the air-fuel ratio control to changes in the air-fuel ratio and the robustness of the same against external disturbances can be improved, and hence the purification rate of the catalysts can be improved to ensure good exhaust emission characteristics of the engine in various operating conditions of the engine.

In the present embodiment, the above described functions of the blocks appearing in FIG. 2 are realized by arithmetic operations executed by the CPU of the ECU 5, and details of the operations will be described with reference to program routines illustrated in the drawings. It should be noted that in the following description, the suffix (k) represents sampling timing in the present discrete system, and (k) and (k−1), for example, indicate that values with these suffixes are the present value and the immediately preceding value, respectively. However, the suffix (k) is omitted unless required specifically.

Figure 3:
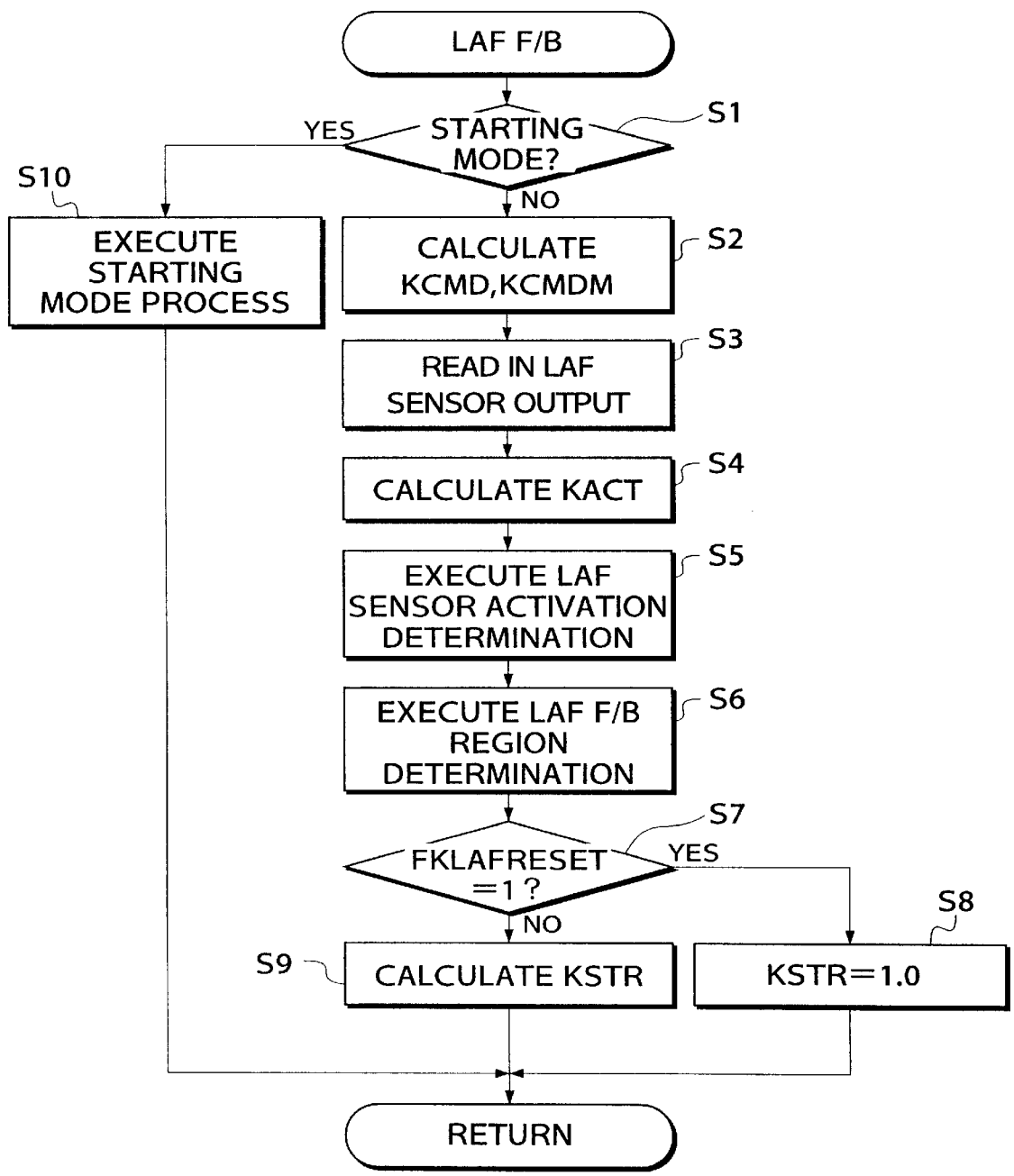
FIG. 3 is a flowchart showing a main routine for calculating an adaptive control correction coefficient KSTR in response to an output from a LAF sensor appearing in FIG. 1.

FIG. 3 shows a main routine for calculating the adaptive control correction coefficient KSTR in response to the output from the LAF sensor 17. This routine is executed in synchronism with generation of TDC signal pulses.

At a step S1, it is determined whether or not the engine is in a starting mode, i.e. whether or not the engine is cranking. If the engine is in the starting mode, the program proceeds to a step S10 to execute a subroutine for the starting mode, not shown. If the engine is not in the starting mode, the desired air-fuel ratio coefficient (desired equivalent ratio) KCMD and the final desired air-fuel ratio coefficient KCMDM are calculated at a step S2, and the LAF sensor output-selecting process is executed at a step S3. Further, the actual equivalent ratio KACT is calculated at a step S4. The actual equivalent ratio KACT is obtained by converting the output from the LAF sensor 17 to an equivalent ratio value.

Then, it is determined at a step S5 whether or not the LAF sensor 17 has been activated. This determination is carried out by comparing the difference between the output voltage from the LAF sensor 17 and a central voltage thereof with a predetermined value (e.g. 0.4 V), and determining that the LAF sensor 17 has been activated when the difference is smaller than the predetermined value.

Then, it is determined at a step S6 whether or not the engine 1 is in an operating region in which the air-fuel ratio feedback control responsive to the output from the LAF sensor 17 is to be carried out (hereinafter referred to as "the LAF feedback control region"). More specifically, it is determined that the engine 1 is in the LAF feedback control region, e.g. when the LAF sensor 17 has been activated but at the same time neither fuel cut nor wide open throttle operation is being carried out. If it is determined that the engine is not in the LAF feedback control region, a reset flag FKLAFRESET which, when set to 1, indicates that the engine is not in the LAF feedback control region, is set to 1, whereas if it is determined the engine is in the LAF feedback control region, the reset flag FKLAFRESET is set to 0.

At the following step S7, it is determined whether or not the reset flag FKLAFRESET assumes 1. If FKLAFRESET=1 holds, the program proceeds to a step S8, wherein the adaptive control correction coefficient KSTR is set to 1.0, followed by terminating the program. On the other hand, if FKLAFRESET=0 holds, the adaptive control correction coefficient KSTR is calculated at a step S9, followed by terminating the present routine.

Figure 4:
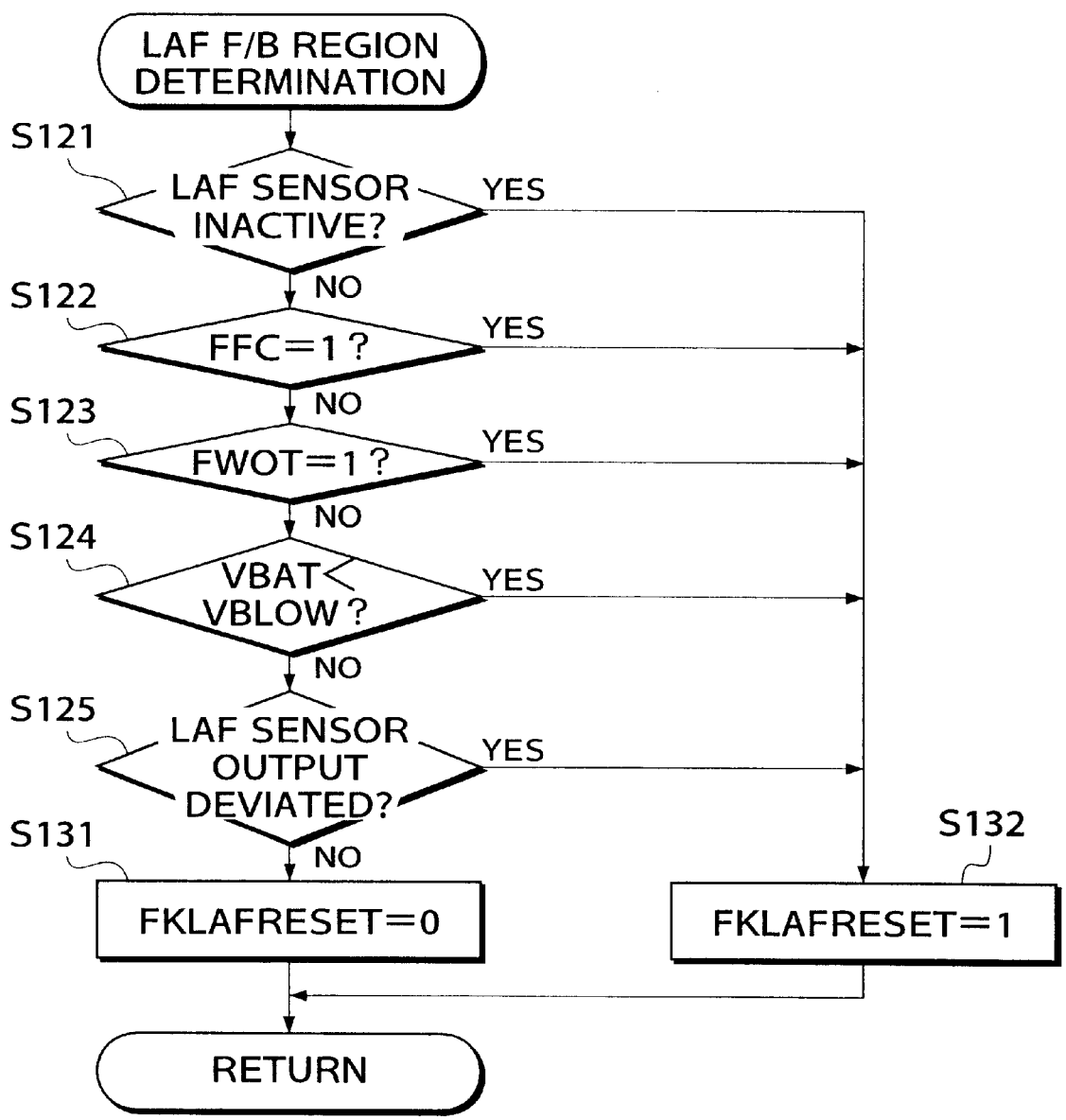
FIG. 4 is a flowchart showing a subroutine for carrying out a LAF feedback control region-determining process, which is executed at a step S6 in FIG. 3.

FIG. 4 shows a subroutine for carrying out a LAF feedback control region-determining process, which is executed at the step S6 in FIG. 3.

First, at a step S121, it is determined whether or not the LAF sensor 17 is in an inactive state. If the LAF sensor 17 is in the inactive state, it is determined at a step S122 whether or not a flag FFC which, when set to 1, indicates that fuel cut is being carried out, assumes 1. If FFC=0 holds, it is determined at a step S123 whether or not the WOT flag FWOT which, when set to 1, indicates that the engine is operating in the wide open throttle condition, assumes 1. If FWOT=1 does not hold, it is determined at a step S124 whether or not battery voltage VBAT detected by a battery voltage sensor, not shown, is lower than a predetermined lower limit value VBLOW. If VBAT≧VBLOW holds, it is determined at a step S125 whether or not there is a deviation of the LAF sensor output from the proper value corresponding to the stoichiometric air-fuel ratio (LAF sensor output deviation). If any of the answers to the questions of the steps S121 to S125 is affirmative (YES), the reset flag FKLAFRESET which, when set to 1, indicates that the feedback control based on the LAF sensor output should be terminated, is set to 1 at a step S132.

On the other hand, if all the answers to the questions of the steps S121 to S125 are negative (NO), it is determined that the feedback control based on the LAF sensor output can be carried out, and therefore the reset flag FKLAFRESET is set to 0 at a step S131.

Next, description will be made of calculation of the adaptive control correction coefficient KSTR with reference to FIG. 5.

Figure 5:
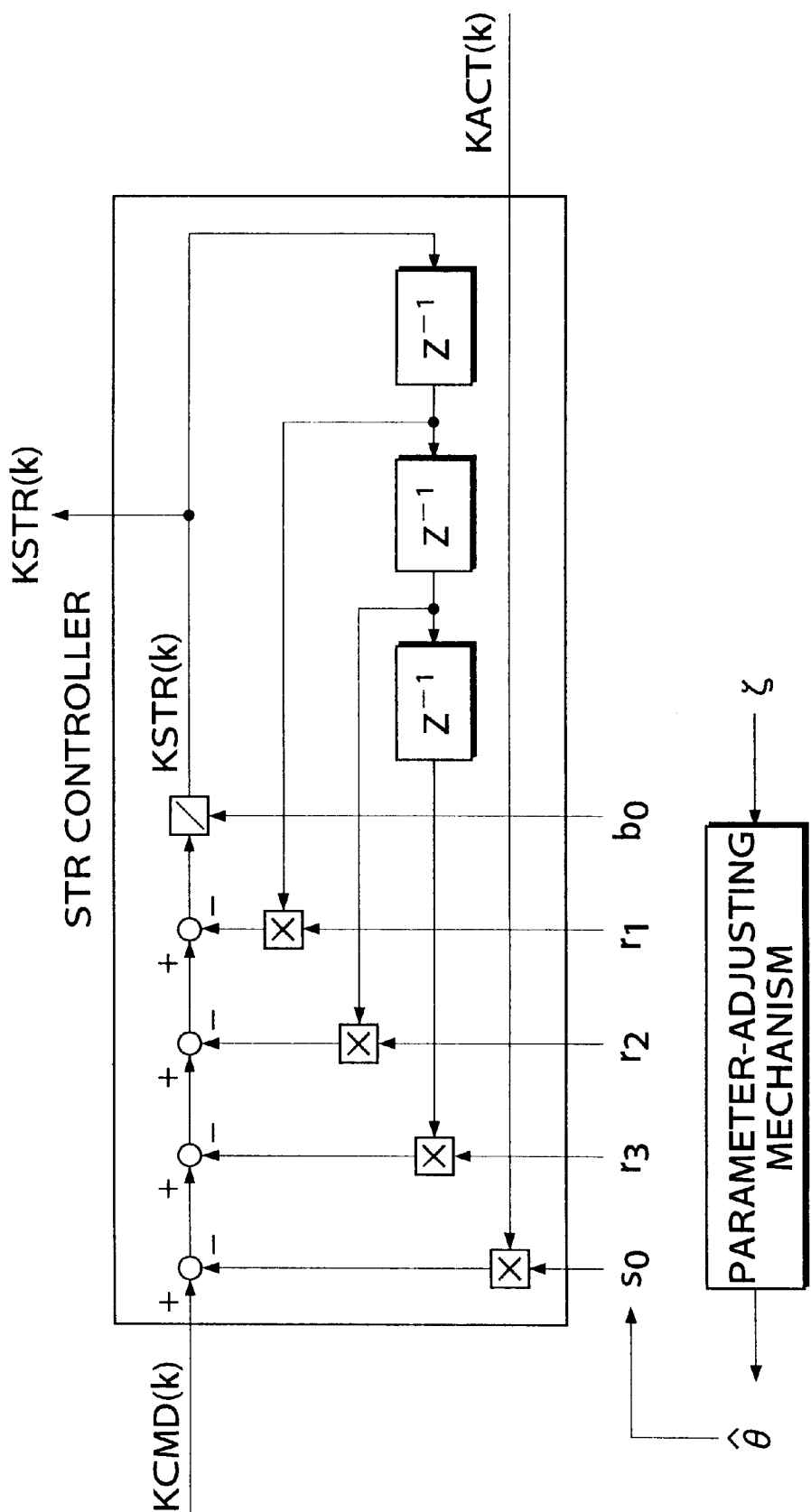
FIG. 5 is a block diagram useful in explaining a manner of calculating the adaptive control correction coefficient KSTR.

FIG. 5 shows the construction of the block B17 in FIG. 2, i.e. the self-tuning regulator (hereinafter referred to as "the STR") block. The STR block is comprised of a STR controller as the self-turning regulator for setting the adaptive control correction coefficient KSTR such that the actual equivalent ratio KACT(k) becomes equal to the desired air-fuel ratio coefficient (desired equivalent ratio) KCMD (k), and an adaptive parameter-adjusting mechanism as adaptive parameter-adjusting means for setting adaptive parameters to be used by the STR controller.

Known adjustment laws (mechanisms) for adaptive control include a parameter adjustment law proposed by Landau et al. This method is described e.g. in Computrole No. 27, CORONA PUBLISHING CO., LTD., Japan, pp. 28–41, Automatic control handbook OHM, LTD., Japan, pp. 703–707, A Survey of Model Reference Adaptive Techniques—Theory and Application, I. D. LANDAU Automatic Vol. 10, pp. 353–379, 1974, Unification of Discrete Time Explicit Model Reference Adaptive Control Designs, I. D. LANDAU et al. Automatic Vol. 17, No. 4, pp. 593–611, 1981, and Combining Model Reference Adaptive Controllers and Stochastic Self-tuning Regulators, I. D. LANDAU Automatic Vol. 18, No. 1., pp. 77–84, 1982. In the present embodiment, the above parameter adjustment law proposed by Landau et al. is employed. This parameter adjustment law will be described in detail, hereinbelow: According to this adjustment law, if polynomials of the denominator and numerator of the transfer function $A(Z^{-1})/B(Z^{-1})$ of the controlled object by a discrete system are expressed by the following equations (2) and (3), the adaptive parameter vector $\hat{\theta}^T(k)$ and the input $\zeta^T(k)$ to the adaptive parameter-adjusting mechanism are defined by the following equations (4) and (5). The equations (4) and (5) define an example of a plant in which m=1, n=1 and d=3 hold, i.e. a system of the first order thereof has a dead time as long as three control cycles. The symbol k used herein indicates the parameter with (k) has the present value, one with (k−1) the immediately preceding value, and so forth, which correspond to respective control cycles. u(k) and y(k) in the equation (5) correspond to the KSTR(k) and KACT(k) values, respectively, in the present embodiment.

$$A(z^{-1})=1+a_1 z^{-1}+\ldots+a_n z^{-n} \quad (2)$$

$$B(z^{-1})=b_0+b_1 z^{-1}+\ldots+b_m z^{-m} \quad (3)$$

$$\hat{\theta}^T(k)=[b_0(k), r_1(k), \ldots rm+d-1(k), s_0(k), \ldots, Sn-1(k)]=[b_0(k), r_1(k), r_2(k), r_3(k), s_0(k)] \quad (4)$$

$$\zeta^T(k)=[u(k), \ldots, u(k-m-d+1), y(k), \ldots, y(k-n+1)]=[u(k), u(k-1), u(k-2), u(k-3), y(k)] \quad (5)$$

The adaptive parameter vector $\hat{\theta}(k)$ is expressed by the following equation (6):

$$\hat{\theta}(k)=\hat{\theta}(k-1)+\Gamma(k-1)\zeta(k-d)e^*(k) \quad (6)$$

where the symbols $\Gamma(k)$ and $e^*(k)$ represent a gain matrix and an identification error signal, respectively, and can be expressed by the following recurrence formulas (7) and (8):

$$\Gamma(k) = \frac{1}{\lambda_1(k)}\left[\Gamma(k-1) - \frac{\lambda_2(k)\Gamma(k-1)\zeta(k-d)\zeta^T(k-d)\Gamma(k-1)}{\lambda_1(k)+\lambda_2(k)\zeta^T(k-d)\Gamma(k-1)\zeta(k-d)}\right] \quad (7)$$

$$e*(k) = \frac{D(z^{-1})y(k) - \hat{\theta}^T(k-1)\zeta(k-d)}{1+\zeta^T(k-d)\Gamma(k-1)\zeta(k-d)} \quad (8)$$

Further, it is possible to provide various specific algorithms depending upon set values of $\lambda_1(k)$ and $\lambda_2(k)$ in the equation (7). For example, if $\lambda_1(k)=1$ and $\lambda_2(k)=\lambda$ ($0<\lambda<2$) hold, a progressively decreasing gain algorithm is provided (if $\lambda=1$, the least square method), if $\lambda_1(k)=\lambda_1$ ($0<\lambda_1<1$) and $\lambda_2(k)=\lambda_2$ ($0<\lambda_2<2$) hold, a variable gain algorithm (if $\lambda_2=1$, the method of weighted least squares), and if $\lambda_1(k)/\lambda_2(k)=\alpha$ and if $\lambda_3$ is expressed by the following equation (9), $\lambda_1(k)=\lambda_3$ provides a fixed trace algorithm. Further, if $\lambda_1(k)=1$ and $\lambda_2(k)=0$ hold, a fixed gain algorithm is obtained. In this case, as is clear from the equation (6), $\Gamma(k)=\Gamma(k-1)$ holds, and hence $\Gamma(k)=\Gamma$(fixed value) is obtained.

Further, $D(Z^{-1})$ in the equation (8) is an asymptotically stable polynomial which can be defined by a system designer as desired to determine the convergence of the system. In the present embodiment, it is set to a value 1.0.

$$\lambda_3(k) = 1 - \frac{\|\Gamma(k-1)\zeta(k-d)\|^2}{\alpha + \zeta^T(k-d)\Gamma(k-1)\zeta(k-d)} \cdot \frac{1}{tr\Gamma(0)} \quad (9)$$

In the equation (9), $tr\Gamma(0)$ is a trace function of the matrix $\Gamma(0)$, and specifically, it is a sum (scalar) of diagonal components of the matrix $\Gamma(0)$.

The STR controller and the adaptive parameter-adjusting mechanism are arranged outside the fuel injection amount-calculating system, and operate to calculate the adaptive control correction coefficient KSTR(k) such that the actual equivalent ratio KACT(k+d) becomes equal to the desired equivalent ratio KCMD(k) in an adaptive manner.

As shown in FIG. 5, the adaptive control correction coefficient KSTR(k) and the actual equivalent ratio KACT(k) are determined, which are input to the adaptive parameter-adjusting mechanism, where the adaptive parameter vector $\hat{\theta}(k)$ is calculated to be input to the STR controller. The STR controller is also supplied with the desired equivalent ratio KCMD(k) and calculates the adaptive control correction coefficient KSTR(k) such that the actual equivalent ratio KACT(k+d) becomes equal to the desired equivalent ratio KCMD(k), by using the following recurrence formula (10):

$$KSTR(k) = \frac{KCMD(k) - s_0 \times KACT(k) - r_1 \times KSTR(k-1) - r_2 \times KSTR(k-2) - r_3 \times KSTR(k-3)}{b_0} \quad (10)$$

The equation (10) (and the equations (4) and (5)) is obtained when the STR controller is designed on assumption that the dead time d of the engine 1 as a plant and the LAF sensor 17 as means for detecting the output from the plan is as long as three control cycles. However, due to a modification of the specifications of the engine 1 or the LAF sensor 17, in some cases, the dead time d can be longer than three control cycles. Assuming that the dead time d=5 holds, for instance, the adaptive parameter vector $\hat{\theta}(k)$ and the input $\zeta T(k)$ to the adaptive parameter-adjusting mechanism are expressed by the following equations (11) and (12):

$$\hat{\theta}^T(k)=[b_0(k), r_1(k), r_2(k), r_3(k), r_4(k), r_5(k), s_0(k)] \quad (11)$$

$$\zeta^T(k)=[u(k), u(k-1), u(k-2), u(k-3), u(k-4), u(k-5), y(k)] \quad (12)$$

Further, the equation for calculating the adaptive control correction coefficient KSTR(k) is expressed by the following equation (13):

$$KSTR(k) = \qquad (13)$$
$$\frac{1}{b_0}\{KCMD(k) - s_0 KACT(k) - r_1 KSTR(k-1) - r_2 KSTR(k-2) -$$
$$r_3 KSTR(k-3) - r_4 KSTR(k-4) - r_5 KSTR(k-5)\}$$

Therefore, the amount of arithmetic operations required to calculate the adaptive control correction coefficient KSTR largely increases to such a level as will make it impractical to calculate the coefficient KSTR by using the CPU installed on the automotive vehicle for control of the engine. To eliminate this inconvenience, in the present embodiment, the configuration of the STR controller is adapted to the dead time d=3 as shown in FIG. 5, and sampling timing (in the present embodiment, the operation cycle in which is calculated the input vector ζ used in the arithmetic operations is referred to as sampling timing) of the input vector ζ to the adaptive parameter-adjusting mechanism is set to a period corresponding to an actual dead time DACT (DACT>d, e.g. 5) (hereinafter referred to as "lowered-order STR"). More specifically, in the above equations (6) to (8), if d=DACT=3 holds, ζ(k−d) is made equal to ζ(k−3), which is also the case with ζ$^T$(k−d), i.e. the transposed determinant of ζ(k−d), and the same applies to the following description. However, if the actual dead time DACT is larger than 3, e.g. equal to 5, the STR controller per se is adapted to d=3, and the input vector ζ(k−d) of the equations (6) to (8) is set to ζ(k−5) which is adapted to the actual dead time DACT. Then, the adaptive parameter vector θ̂(k) (which is composed of elements $b_0$, $s_0$, $r_1$, $r_2$, and $r_3$ exclusive of $r_4$ and $r_5$) is applied to the equation (10) to calculate the adaptive control correction coefficient KSTR. In this case, the vector ζ(k) is expressed by the right side of the equation (5), which naturally corresponds to d=3, and the orders of terms of the equation applied are not increased.

The employment of the lowered-order STR makes it possible to carry out the adaptive control in a manner adapted to the actual dead time DACT without increasing the orders of terms of equations used in the STR controller and the adaptive parameter-adjusting mechanism, and hence carry out high-accuracy adaptive control while minimizing an increase in the amount of arithmetic operations required to obtain the adaptive control correction coefficient KSTR.

Figure 6A:
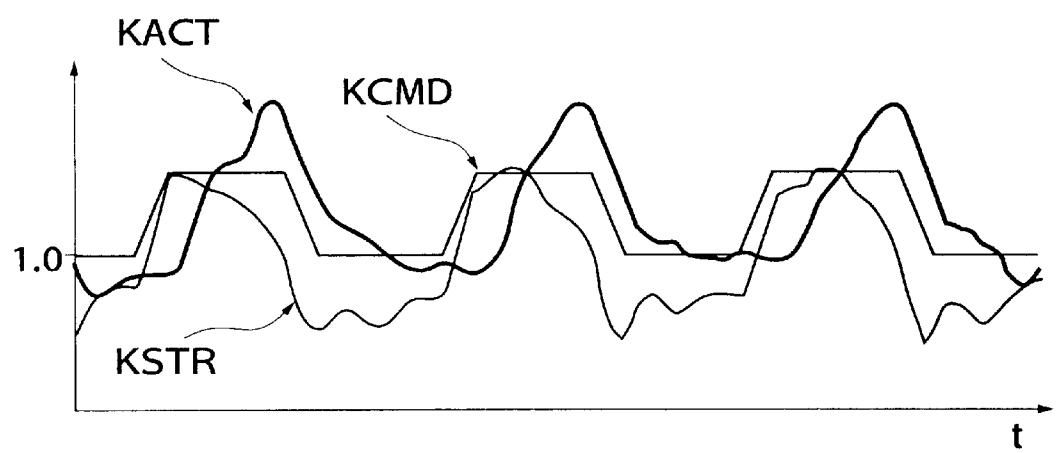
FIGS. 6A and 6B are diagrams useful in explaining improved control performance exhibited by a control method employed in the first embodiment.
Figure 6B:
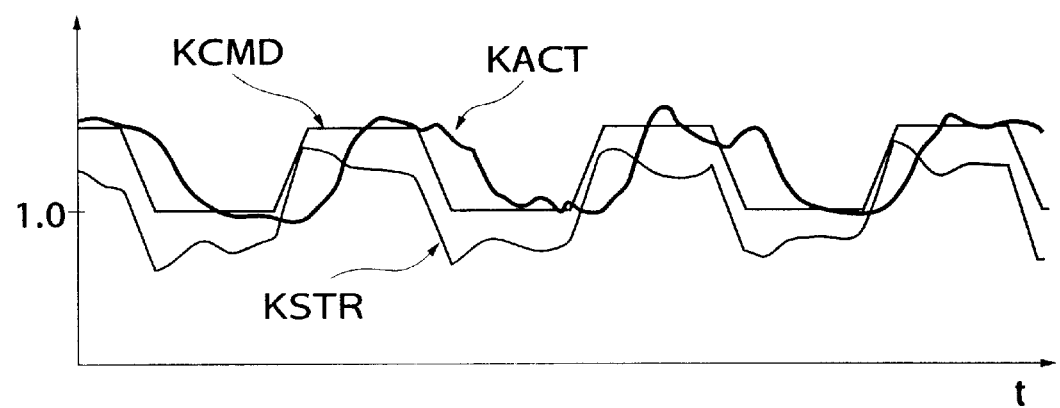

FIGS. 6A and 6B show examples of changes in the adaptive correction coefficient KSTR and the actual equivalent ration KACT which occurred when the desired equivalent ratio KCMD was changed in the case where the actual dead time DACT of the controlled object is longer than three control cycles. FIG. 6A shows a case in which the STR controller is adapted to the dead time d=3, and the sampling timing of the input vector ζ to the adaptive parameter-adjusting mechanism is also set to a period corresponding to the dead time d=3 by setting the factor ζ(k−d) in the equations (6) to (8) to ζ(k−3), while FIG. 6B shows a case in which the STR controller is adapted to the dead time d=3, and the sampling timing of the input vector ζ to the adaptive parameter-adjusting mechanism is set to a period corresponding to the dead time d=4, which is substantially equal to the actual dead time DACT by setting the factor ζ(k−d) in the equations (6) to (8) to ζ(k−4). As is clear from these figures, even if the dead time d employed in designing the STR controller is shorter than the actual dead time DACT, it is possible to largely improve the responsiveness and stability of the adaptive control.

In general, the actual dead time of the controlled object is an analog value which changes continuously. However, in the adaptive control, the dead time has to be converted into a discrete or digital value. Therefore, assuming that the actual dead time is as long as 4.5 control cycles, for instance, it is preferable to select the more suitable one of values 4 and 5 for the dead time through comparison between control performance exhibited when the dead time DACT is set to 4 and that exhibited when the same is set to 5.

As described above, the employment of the lowered-order STR can enhance the performance of the adaptive control without increasing the amount of arithmetic operations. However, the model assumed in designing the control system is different from the actual object to be controlled, so that the adaptive parameter vector θ̂ can be liable to drift. Further, even if the lowering of orders of equations is not carried out, the equation (6) performs accumulation of slight identification errors caused by external disturbances in the adaptive parameter vector. Therefore, so long as the adaptive parameter vector θ̂ is calculated by using the equation (6), it is inevitable that the adaptive parameter vector θ̂ drifts when the engine continues to be in a steady operating condition.

To eliminate this inconvenience, in the present embodiment, means is additionally provided for preventing the adaptive parameter vector θ̂ from drifting. This means will be described in detail hereinafter.

FIG. 7A shows an adaptive parameter vector-calculating section employed in the control system according to the present embodiment, for calculating the adaptive parameter vector θ̂. In the figure, eid(k) and Q(k) represent the identification error and the variable gain, respectively, which are defined by the following equations (14) and (15), respectively:

$$eid(k) = D(Z^{-1})y(k) - \hat{\theta}^T(k-1)\zeta(k-d) \qquad (14)$$

$$Q(k) = \frac{\Gamma(k-1)\zeta(k-d)}{1 + \zeta^T(k-d)\Gamma(k-1)\zeta(k-d)} \qquad (15)$$

The identification error eid(k) corresponds to the numerator of the identification error signal e* (equation (8)), while the variable gain Q(k) corresponds to a quotient obtained by dividing the second term of the equation (6) by the identification error eid(k). When the identification error eid and the variable gain Q(k) are used, the adaptive parameter vector θ̂(k) is expressed by the following equation (16):

$$\hat{\theta}(k) = \hat{\theta}(k-1) + Q(k)eid(k) \qquad (16)$$

Figure 8A:
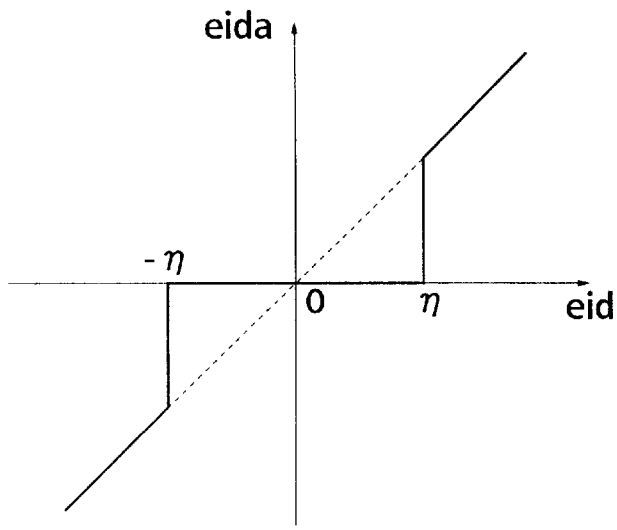
FIGS. 8A and 8B are diagrams useful for explaining characteristics of a filter appearing in FIG. 7A.

As shown in FIG. 7A, the identification error eid(k) is input to a nonlinear filter B51 and an output eida(k) therefrom is input via a multiplier B52 to an integrator B53. The nonlinear filter B51 has an input/output characteristic e.g. as shown in FIG. 8A. More specifically, when −η≦eid≦η holds (η represents a predetermined value empirically obtained), which means that eid falls within the deadzone defined by −η and η, the output eida is set equal to 0 and when the identification error eid is outside the dead zone, the output eida is set equal to the input eid.

The arithmetic operations carried out at the blocks B52 and B53 correspond to those carried out by using the equation (16) in which eid(k) is replaced by eida(k).

In the present embodiment, the process of the nonlinear filter B51 is additionally carried out. As a result, when the engine enters a steady operating condition, and identification of the adaptive parameter vector θ̂ is substantially completed, the identification error eid falls within the dead zone defined between −η and η, so that the output eida from the block B51 is equal to 0, which prevents slight identification errors caused by differences in characteristics between the model assumed in designing the control system and the actual plant and external disturbances from being accumulated in the adaptive parameter vector $\hat{\theta}$, to thereby prevent drifting of the adaptive parameter vector $\hat{\theta}$.

Figure 8B:
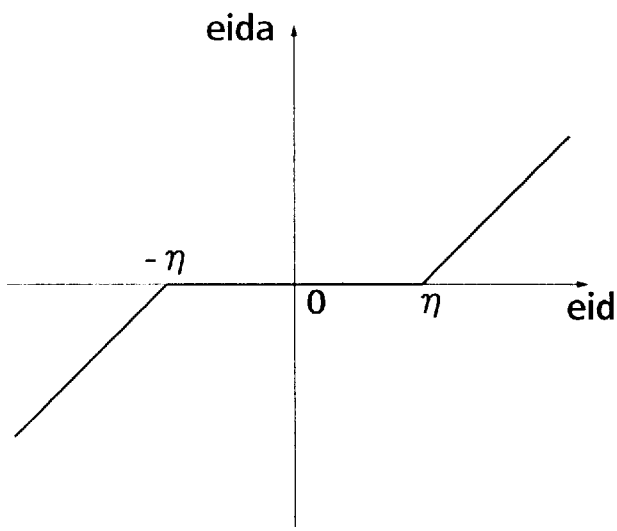

The input/output characteristic of the nonlinear filter B51 shown in FIG. 8A shows a discontinuity as the input eid changes across $-\eta$, or $\eta$, which causes a drastic change in the vector $\hat{\theta}$ when the identification error eid goes beyond the dead zone. To eliminate this inconvenience, it is preferable that the nonlinear filter B51 has an input/output characteristic free from discontinuities as shown e.g. in FIG. 8B. That is, when $-\eta \leq eid \leq \eta$ holds, the output eida is set to 0, while when eid>$\eta$ holds, the same is set to eid-$\eta$, and when eid<$\eta$, holds, the same is set to eid+$\eta$.

Further, the arrangement of FIG. 7A in which the nonlinear filter B51 alone is added undergoes occurrence of a steady state error of the adaptive control (steady state error between the desired equivalent ratio KCMD and the actual equivalent ration KACT). This is because the identification error within the dead zone does not reflect on the adaptive parameter vector $\hat{\theta}$.

To overcome this inconvenience, it is desirable that blocks B61 to B66 are additionally provided, as shown in FIG. 7B. Multipliers B61, B64, an adder B62, and a delay B63 constitute a first-order lag filter (low-pass filter). The output eidf from this filter has its level limited by a limiting filter B65, and is added to the output eida from the nonlinear filter B51 by an adder B66. The output from the adder B66 is input to the multiplier B52.

The output eidf from the first-order lag filter eidf is expressed by the following equation (17):

$$eidf = CLF \times eidfa(k-1) + (1-CLF) \times eid(k) \qquad (17)$$

wherein CLF represents an averaging coefficient which is set to a value smaller than 1 but very close to 1, e.g. "0.988". In other words, the coefficient CLF is provided to set the cutoff frequency of the low-pass filter to a value close to 0.

Figure 8C:
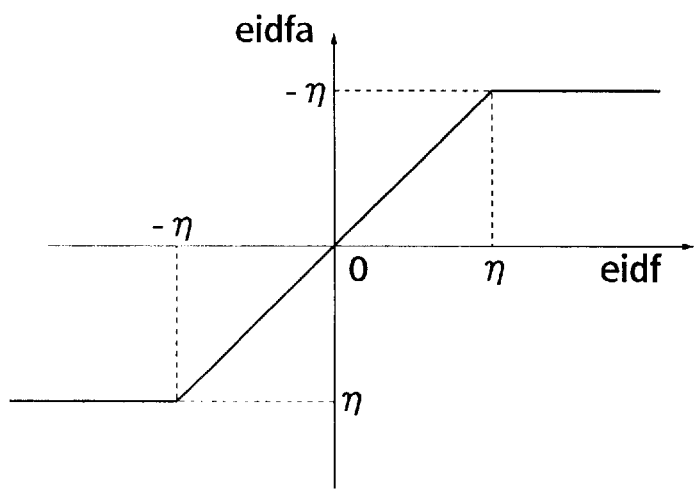
FIG. 8C is a diagram useful for explaining characteristics of a filter appearing in FIG. 7B.

The limiting filter 65 constitutes a limiter having a characteristic as shown in FIG. 8C. More specifically, when the output eidf from the first-order lag filter, which is input to this limiter, is smaller than $-\eta$, an output eidfa from the limiter is set to $-\eta$, whereas when the output eidf is larger than $\eta$, the output eidfa is set to $\eta$. When $-\eta \leq eid \leq \eta$ holds, eidfa is set to eidf.

In a variation shown in FIG. 7B, a steady state error component of the identification error eid is extracted by the low-pass filter having a cut-off frequency close to 0 and added to the output eida from the nonlinear filter B51. As a result, the steady state error component in the identification error eid is reflected on the adaptive parameter vector $\hat{\theta}$ to thereby reduce the steady state error of the adaptive control (steady state error between the desired equivalent ratio KCMD and the actual equivalent ratio KACT).

Further, the provision of the limiting filter B65 prevents the steady state error component of the identification error eid used for calculation of the adaptive parameter vector $\hat{\theta}$ from becoming larger than the original value due to the addition by the adder B66 when the identification error eid falls outside the dead zone (i.e. eid>$\eta$ or eid<-$\eta$).

Next, the equation for calculating the adaptive control correction coefficient KSTR actually employed in the present embodiment will be described. The above equations (5) to (10) are applied to a case where the control cycle and the repetition period of calculation of the KSTR value (repetition period of generation of TDC signal pulses) coincide with each other and the adaptive control correction coefficient KSTR thus calculated is commonly used for all the cylinders. In the present embodiment, however, the control cycle is as long as four TDC signal pulses corresponding to the number of cylinders, whereby the adaptive control correction coefficient KSTR is determined cylinder by cylinder. More specifically, the above-mentioned equations (5) to (10) are replaced by the following equations (18) to (23), respectively, to calculate the adaptive control correction coefficient KSTR cylinder by cylinder for use in the adaptive control:

$$\zeta^T(k) = [u(k), u(k-4), u(k-8), u(k-12), y(k)] \qquad (18)$$

$$\hat{\theta}(k) = \hat{\theta}(k-4) + \Gamma(k-4)\zeta(k-4 \times d)e*(k) \qquad (19)$$

$$\Gamma(k) = \frac{1}{\lambda_1(k)}\left[\Gamma(k-4) - \frac{\lambda_2(k)\Gamma(k-4)\zeta(k-4 \times d)\zeta^T(k-4 \times d)\Gamma(k-4)}{\lambda_1(k) + \lambda_2(k)\zeta^T(k-4 \times d)\Gamma(k-4)\zeta(k-4 \times d)}\right] \qquad (20)$$

$$e*(k) = \frac{D(z^{-1})y(k) - \hat{\theta}^T(k-4)\zeta(k-4 \times d)}{1 + \zeta^T(k-4 \times d)\Gamma(k-4)\zeta(k-4 \times d)} \qquad (21)$$

$$\lambda_3(k) = 1 - \frac{\|\Gamma(k-4)\zeta(k-4 \times d)\|^2}{\alpha + \zeta^T(k-4 \times d)\Gamma(k-4)\zeta(k-4 \times d)} \cdot \frac{1}{tr\Gamma(0)} \qquad (22)$$

$$KSTR(k) = \frac{\{KCMD(k) - s_0 \times KACT(k) - r_1 \times KSTR(k-4) - r_2 \times KSTR(k-8) - r_3 \times KSTR(k-12)\}}{b_0} \qquad (23)$$

It should be noted that when the actual dead time DACT is e.g. 4, the adaptive parameters $b_0$, $s_0$, $r_1$ to $r_3$ are calculated by using the equations (19) to (22) with d set to 4.

Figure 9:
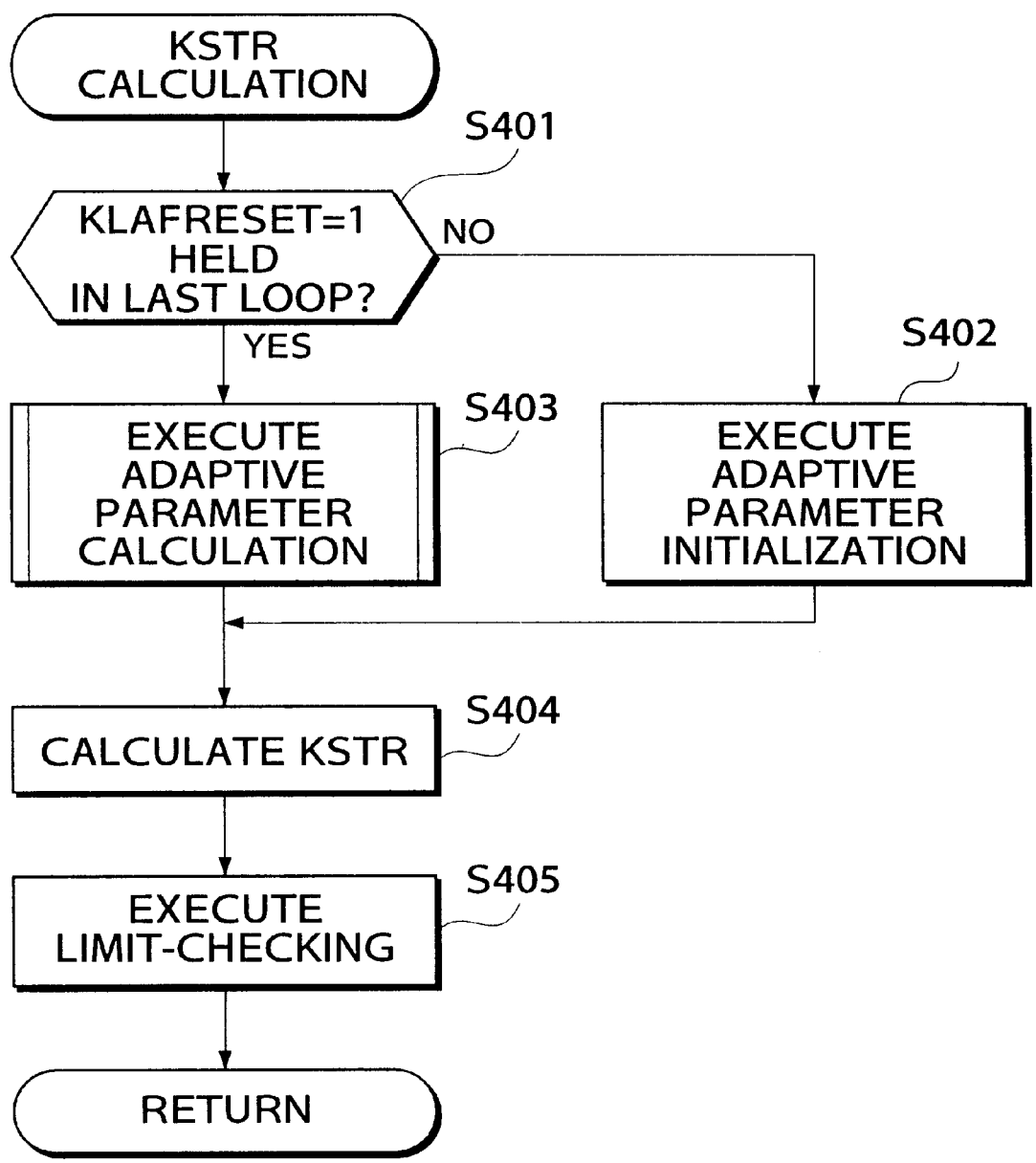
FIG. 9 is a flowchart showing a subroutine for calculating the adaptive control correction coefficient KSTR.

FIG. 9 shows a subroutine for calculating the adaptive control correction coefficient KSTR which is executed at the step S9 in FIG. 3.

First, at a step S401, it is determined whether or not the reset flag FKLAFRESET assumed "1" in the last loop. If FKLAFRESET="1" held in the last loop, which means that the adaptive control was not carried out in the last loop, the initialization of the adaptive parameters $b_0$, $s_0$ and $r_1$ to $r_3$ is carried out by setting them to respective initial values, and then the program proceeds to a step S404. On the other hand, if it is determined at the step S401 that FKLAFRESET="1" held, which means that the adaptive control was carried out in the last loop as well, the process for calculating the adaptive parameters $b_0$, $s_0$ and $r_1$ to $r_3$ is carried out by executing a routine shown in FIG. 10.

In the present embodiment, the calculation of $\hat{\theta}(k)$, i.e. adaptive parameters $b_0$, $s_0$ and $r_1$ to $r_3$ by using the equation (19) is carried out once per four-TDC periods (time period over which four TDC signal pulses are generated, i.e. one combustion cycle). Therefore, at a step S431 in FIG. 10, it is determined whether or not four TDC periods have elapsed from the last calculation of the adaptive parameters using the equation (19). If it is determined that four TDC periods have elapsed, the adaptive parameters $b_0(k)$, $s_0(k)$, and $r_1(k)$ to $r_3(k)$ are calculated by using the equation (19) at a step S432. If four TDC periods have not elapsed, the adaptive parameters $b_0$, $s_0$ and $r_1$ to $r_3$ are set to respective immediately preceding values $b_0(k-1)$, $s_0(k-1)$, and $r_1(k-1)$ to $r_3(k-1)$.

After execution of the step S432 or S433, moving average values $b_0AV$, $s_0AV$, $r_1AV$, $r_2AV$, and $r_3AV$ over p TDC periods (e.g. p=8, i.e. 8 TDC periods) are calculated by using the following equations (24) to (28) at a step S434, followed by terminating the program. The control system includes a ring buffer (memory means) for storing values of the adaptive parameters $b_0$, $s_0$, $r_1$ to $r_3$ obtained over the p TDC periods (hereinafter p will be referred to as "the averaging period") to calculate the moving average values. The contents of the ring buffer are updated to newly-calculated adaptive parameter values or the immediately preceding values whenever one TDC period elapses, whereby the oldest data stored therein are erased. The updating of the contents of the ring buffer may be carried out by storing a newly calculated value of the adaptive parameter vector $\hat{\theta}$ over four TDC periods (i.e. by storing the newly calculated value $\hat{\theta}(k)$ as the values $\hat{\theta}(k)$ to $\hat{\theta}(k+3)$:

$$b_0 AV = \sum_{i=0}^{p-1} b_0(k-i)/p \tag{24}$$

$$s_0 AV = \sum_{i=0}^{p-1} s_0(k-i)/p \tag{25}$$

$$r_1 AV = \sum_{i=0}^{p-1} r_1(k-i)/p \tag{26}$$

$$r_2 AV = \sum_{i=0}^{p-1} r_2(k-i)/p \tag{27}$$

$$r_3 AV = \sum_{i=0}^{p-1} r_3(k-i)/p \tag{28}$$

Figure 11:
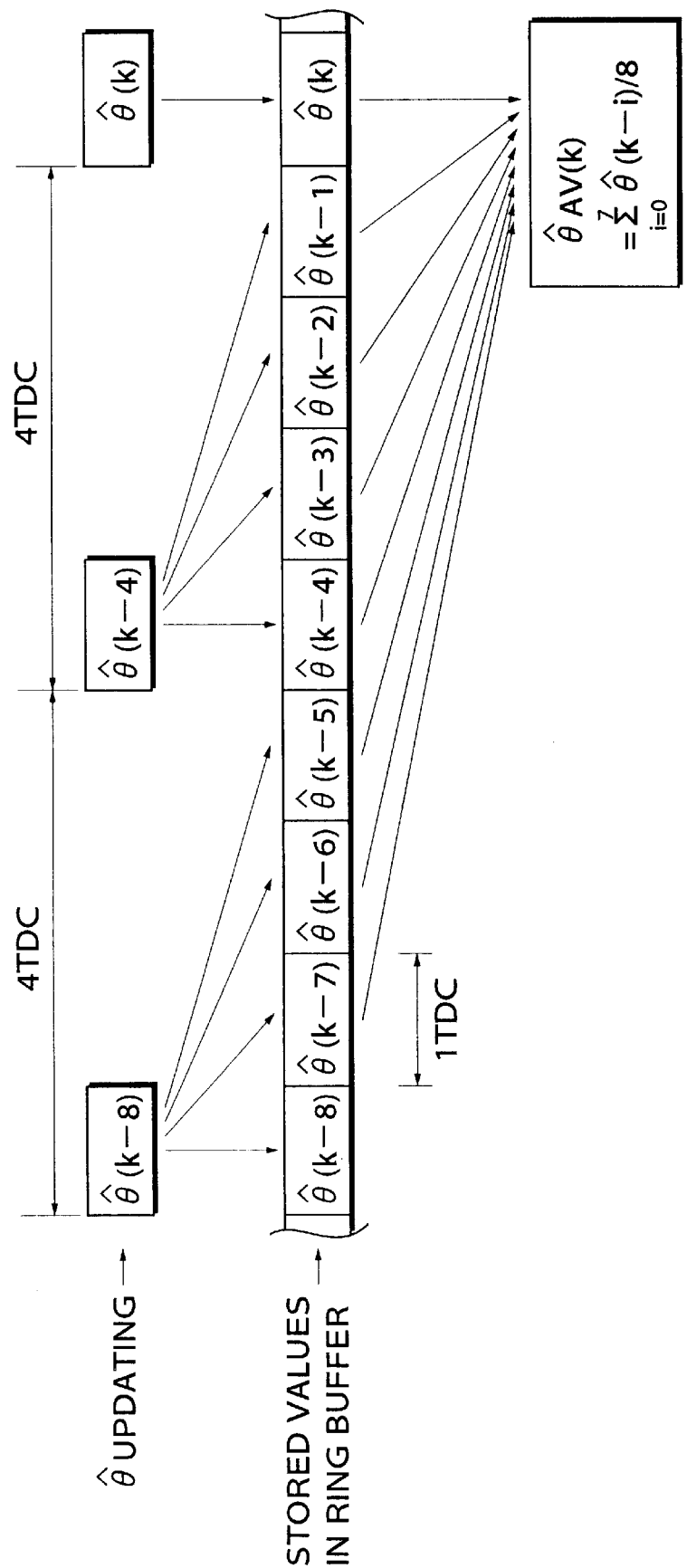
FIG. 11 is a diagram which is useful in explaining a method of calculating moving average values of the adaptive parameters.

FIG. 11 illustrates a method of calculating a moving average value $\hat{\theta}AV$ when the averaging period p=8 holds. In the figure, the updating of the adaptive parameter vector $\hat{\theta}$ is carried out once per four TDC periods, and hence $\hat{\theta}(k-8)=\hat{\theta}(k-7)=\hat{\theta}(k-6)=\hat{\theta}(k-5)$ and $\hat{\theta}(k-4)=\hat{\theta}(k-3)=\hat{\theta}(k-2)=\hat{\theta}(k-1)$ hold. Therefore, the updated $\hat{\theta}$ value is progressively reflected on the moving average value $\hat{\theta}AV$. That is, the calculation of the moving average value is not intended to merely average the value based on the moving average values $\hat{\theta}(k-8)$, $\hat{\theta}(k-4)$, $\hat{\theta}(k)$, etc.

Figure 12:
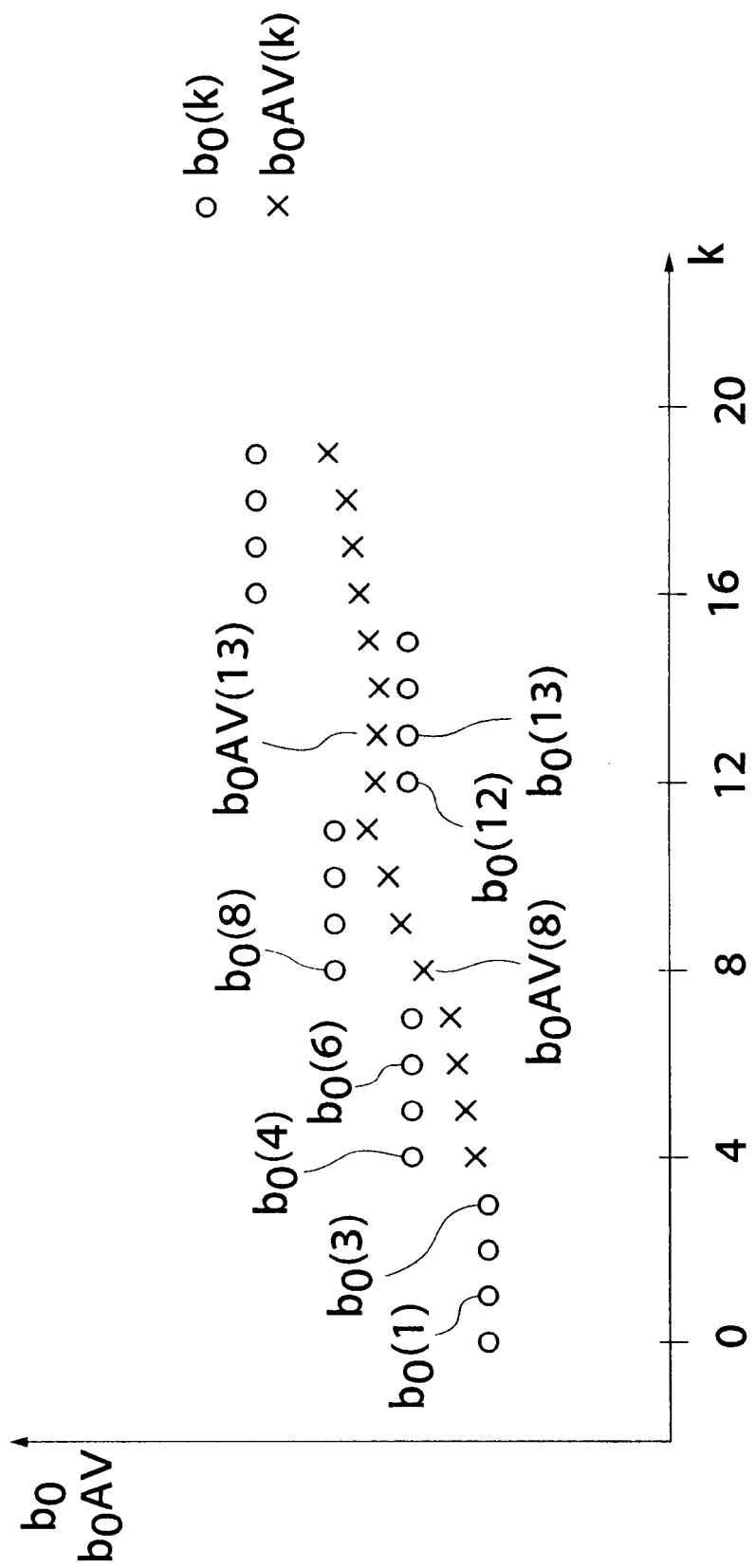
FIG. 12 is a diagram showing changes in adaptive parameter values and their moving average values.

FIG. 12 shows an example of changes in the adaptive parameter $b_0$ and the moving average value $b_0AV$. In this figure, the adaptive parameter values $b_0(0)$ to $b_0(4)$ have initial values thereof set to an identical value. A moving average value $b_0AV(8)$ is calculated as an average value of adaptive parameter values $b_0(1)$ to $b_0(8)$, and a moving average value $b_0AV(13)$ is calculated as an average value of adaptive parameter values $b_0(6)$ to $b_0(13)$. More specifically, the moving average value $b_0AV(8)$ can be regarded as a value obtained by weighted interpolation of an initial value represented by the adaptive parameter value $b_0(0)$, a first updated value represented by the adaptive parameter value $b_0(4)$, and a second updated value represented by the adaptive parameter value $b_0(8)$, while the moving average value $b_0AV(13)$ as a value obtained by weighted interpolation of the first updated value represented by the adaptive parameter value $b_0(4)$, the second updated value represented by the adaptive parameter value $b_0(8)$, and a third updated value represented by an adaptive parameter value $b_0(12)$.

Figure 10:
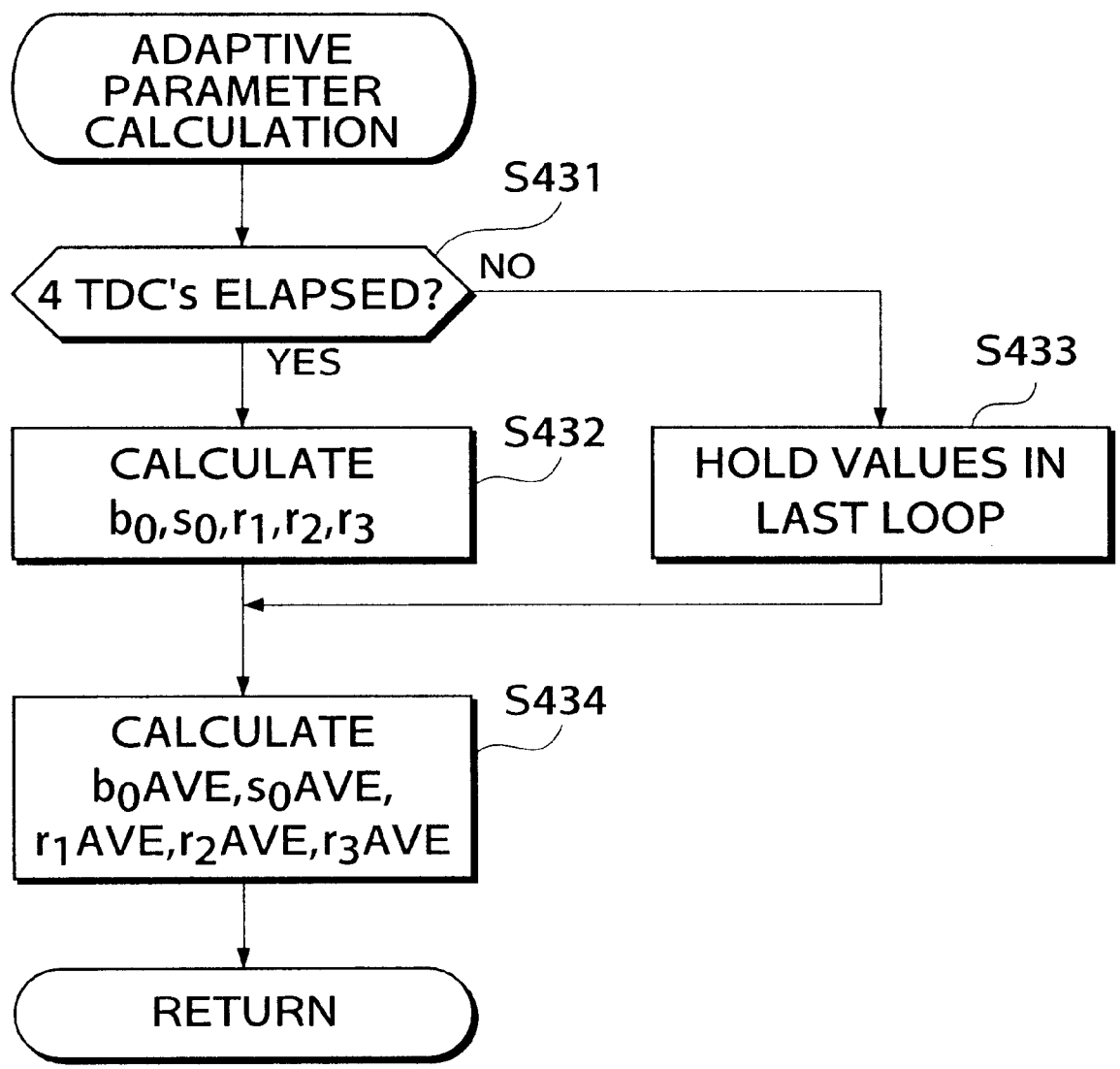
FIG. 10 is a flowchart showing a subroutine for calculating adaptive parameters.

Referring again to FIG. 9, at the step S404, the adaptive control correction coefficient KSTR is calculated by using the moving average values $b_0AV$, $s_0AV$, $r_1AV$ to $r_3AV$ of the adaptive parameters obtained at the step S434 in FIG. 10. The use of the moving average values makes it possible to prevent the adaptive control from becoming unstable due to updating of the adaptive parameters $b_0$, $s_0$, $r_1$ to $r_3$ at a frequency of once per four TDC periods and low-pass characteristics of the LAF sensor 17. More specifically, the calculation of the moving average values can eliminate components of the identification error signals e* which exhibit peaks (resonance) at a particular frequency and harmonic frequencies thereof, to thereby stabilize the adaptive control. This advantageous effect is exhibited to the highest degree when the averaging period p is set to a value corresponding to a repetition period corresponding to the particular frequency (e.g. p=12 when the reciprocal of the particular frequency is as long as twelve TDC periods). Assuming that the optimal value of the averaging period p is 12, however, it is possible to achieve practically satisfactory stability even if the averaging period p is set to 4.

At the following step S405, limit-checking of the calculated KSTR value is carried out. More specifically, if the calculated KSTR value is larger than a predetermined upper limit value, the coefficient KSTR is set to the predetermined upper limit value, whereas if the same is smaller than a predetermined lower limit value, the coefficient KSTR is set to the predetermined lower limit value. If the calculated KSTR value is within a range defined between the upper and lower limit values, the program is immediately terminated.

In the present embodiment, the engine 1 corresponds to a plant, the LAF sensor 17 to detecting means or air-fuel ratio detecting means, the STR controller in FIG. 5 to an adaptive controller, and the adaptive parameter-adjusting mechanism to adaptive parameter-adjusting means. The STR controller and the adaptive parameter-adjusting mechanism are embodied by the ECU 5.

Although in the above described embodiment, the identification error eid corresponding to the numerator of the identification error signal e* is subjected to the nonlinear filtering process and low-pass filtering process, this is not limitative, but the same processes can be carried out on the identification error signal e*. Further, in the above described embodiment, the nonlinear filter B51 has a characteristic that when the identification error eid is within the dead zone, the output eida is set to 0, this is not limitative, but the filter B51 may be configured such that the output eida is set to a value very close to 0 even if not equal to 0.

Further, the repetition period of updating the adaptive parameter vector $\hat{\theta}$ is not necessarily limited to four TDC periods, but it may be set to two, six, eight or other TDC periods. Further, the above described moving average values of the adaptive parameter vector $\hat{\theta}$ need not be necessarily used for calculation of the adaptive parameter coefficient KSTR carried out whenever one TDC period elapses, but values calculated by interpolation using elements of the previous updated vector values $\hat{\theta}(k-4)$, $\hat{\theta}(k-8)$, etc., and corresponding elements of the present updated vector value $\hat{\theta}(k)$ or by a known smoothing process (low-pass filtering process) using the following equation (29) may be alternatively used for calculation of the coefficient KSTR:

$$\hat{\theta}AV(k)=CAV \times \hat{\theta}AV(k-1)+(1-CAV)\hat{\theta}(k) \tag{29}$$

where CAV represents an averaging coefficient set to a value between 0 and 1.

More specifically, elements of the adaptive parameter vector $\hat{\theta}$ updated whenever four TDC periods elapse are subjected to smoothing whenever one TDC period elapses to use the thus obtained adaptive parameter values for calculation of the coefficient KSTR. According to the smoothing process through calculation of the moving average values, however, it is possible to obtain a comb filter characteristic that the degree of attenuation increases at a frequency corresponding to the reciprocal of the averaging period p and frequencies of integral multiples of the frequency, whereby unnecessary frequency components alone can be effectively attenuated. Therefore, it is more preferable to use the adaptive parameter values obtained through calculation of the moving average values.

Further, in the case where the adaptive parameter vector $\hat{\theta}$ is updated whenever four TDC periods elapse, at a time point k of updating of the adaptive parameter vector $\hat{\theta}$, values thereof at respective time points (k+1), (k+2) and (k+3) are also determined, and therefore the averaging calculation need not be necessarily carried out every TDC period, but the average values may be collectively calculated and stored at one time when the adaptive parameter vector $\hat{\theta}$ is updated, and when the coefficient KSTR is calculated, corresponding values stored may be read out for use in calculation of the coefficient KSTR. Alternatively, the averaging calculation may be carried out with a repetition period shorter than one TDC period (e.g. every time period during which the crankshaft of the engine rotates through 30 degrees).

Next, a second embodiment of the invention will be described.

In the first embodiment described above, the nonlinear filter is employed to prevent the adaptive parameters from drifting. According to this technique, however, the optimal value of the predetermined value $\eta$ that defines the dead zone can vary depending on operating conditions of the engine as the controlled object, due to aging changes in characteristics of the LAF sensor 17, etc., so that the dead zone can become unsuitable for the adaptive control after being applied for a long time.

To eliminate this inconvenience, according to the second embodiment, other means is employed for preventing drifts of the adaptive parameters, instead of the nonlinear filter. Except for this, the second embodiment is substantially identical in construction with the first embodiment.

In the present embodiment, the equation (6) is replaced by the following equation (30) for calculating the adaptive parameter vector $\hat{\theta}$. The equation (30) can be embodied as an adaptive parameter-calculating section shown in FIG. 13A. In the figure, B71 and B74 represent multipliers, B72 an adder, and a block B73 a delay block for delaying the signal by one sampling period.

$$\hat{\theta}(k) = \sigma\hat{\theta}(k-1) + \Gamma(k-1)\zeta(k-d)e^*(k) = \sigma\hat{\theta}(k-1) + Q(k)eid(k) \quad (30)$$

wherein $\sigma$ represents a forgetting factor vector set or expressed by the following equation (31):

$$\sigma = [Sb_0, Sr_1, Sr_2, \ldots, Sr_{m+d-1}, Ss_0, \ldots, Ss_{n-1}, ] = [Sb_0, Sr_1, Sr_2, Sr_3, Ss_0] \quad (31)$$

wherein the second equation is obtained in the case where m=n=1 and d=3 hold.

The second equation of the equation (30) can be expanded into the following equation (32):

$$\hat{\theta}(k) = \sigma^k\hat{\theta}(0) + \sigma^{k-1}Q(1)eid(1) + \sigma^{k-2}Q(2)eid(2) + \ldots + \sigma Q(k-1)eid(k-1) + Q(k)eid(k) \quad (32)$$

In this equation, the identification errors eid(1), eid(2), ... obtained in the past are multiplied by (k-1)-th power, (k-2)-th power, ..., of the forgetting factor vector $\sigma$, respectively.

Therefore, by setting the elements $Sb_0, Sr_1, \ldots, Ss_0$, etc. of the forgetting factor vector $\sigma$ to values larger than 0 but smaller than 1, the influence of the identification error eid obtained in the past is reduced as the value of k increases, i.e. the influence of the previous eid values can be progressively decreased. This prevents a slight identification error caused by difference in characteristics between the model used in designing the control system and the actual plant and external disturbances from being endlessly accumulated in the adaptive parameter vector $\hat{\theta}$, to thereby prevent the same from drifting. As is clear from the equation (31), as the elements $Sb_0, Sr_1, \ldots, Ss_0$ of the forgetting factor vector $\sigma$ are made closer to 0, the degree of influence of the previous values of the identification error eid is decreased. Therefore, it is preferable to determine the values of these elements by empirically determining the oldest one of the previous values of the adaptive parameter vector that are to be reflected on the present value, to ensure good control characteristics of the adaptive controller.

Introduction of the forgetting factor $\sigma$ causes the elements or adaptive parameters of the adaptive parameter vector $\hat{\theta}$ to assume progressively smaller values toward 0 when the engine operates in a steady operating condition in which the identification error signal e* (identification error eid) becomes very small in value. The adaptive parameter $b_0$ is, however, the denominator of the equation (10) (or the equation (23)), so that if the adaptive parameter $b_0$ progressively becomes closer to 0, the adaptive control correction coefficient KSTR becomes infinite to cause divergence of the control. To avoid this inconvenience, it is preferred that the element $Sb_0$ of the forgetting factor vector $\sigma$ is set to 1. Even with this setting, the other adaptive parameters $r_1$, $r_2, \ldots, s_0$, etc. are limited to finite values by the forgetting factors $Sr_1, Sr_2, \ldots, Ss_0$, etc. to prevent divergence of the absolute value of the adaptive parameter $b_0$. Description will be made further in this respect:

The adaptive parameter vector $\hat{\theta}$ is adjusted such that the identification error eid(k) expressed by the equation (14) becomes equal to zero. In the present embodiment, the polynomial $D(Z^{-1})=1$ holds, and hence assuming that eid(k) is equal to 0, there holds the relationship expressed by the following equation (33):

$$y(k) = \hat{\theta}^T(k-1)\zeta(k-d) \quad (33)$$

If in the equation (33), y(k)=KACT(k), u(k)=KSTR(k) and d=3 holds, the equation (33) can be transformed into the following equation (34):

$$KACT(k) = b_0KSTR(k-3) + r_1KSTR(k-4) + r_2KSTR(k-5) + r_3KSTR(k-6) + s_0KACT(k-3) \quad (34)$$

In the equation (34), the actual equivalent ratio KACT(k) and the adaptive control correction coefficient KSTR(k) are finite values, and therefore, so long as the adaptive parameters $r_1, r_2, r_3$, and $s_0$ are finite values, the adaptive parameter b0 naturally assumes a finite value so that no divergence of the adaptive control occurs.

The elements $Sr_1, Sr_2, \ldots, Ss_0$ other than the element $Sb_0$ of the forgetting factor vector $\sigma$ may be all set to an identical value S, e.g. a value within a range of 0.95 to 0.99.

Further, even if some of the elements $Sr_1, Sr_2, \ldots, Ss_0$ other than the element Sb0 of the forgetting factor vector $\sigma$ may be set to 1, so as to inhibit its forgetting function, it is possible to more effectively prevent the adaptive parameter vector $\hat{\theta}$ from drifting than in the case of using the equation (6) in which no multiplication by the forgetting factor $\sigma$ is carried out.

In the present embodiment, the STR controller appearing in FIG. 5 corresponds to the adaptive controller, the adaptive parameter-adjusting mechanism to the adaptive parameter vector-adjusting means, and the elements of the forgetting factor vector $\sigma$ to predetermined coefficients.

Next, a third embodiment of the invention will be described.

In the second embodiment described above, the forgetting factor $\sigma$ is introduced to prevent drifting of the adaptive parameters. This technique, however, has the inconvenience that the ability of compensating for dynamic characteristics of the engine, which is originally provided by the adaptive control, can lower since the elements $r_1, r_2, s_0$, etc. other than the element b0 of the adaptive parameter vector converge to 0 or values close thereto when the engine continues to be in a steady operating condition.

To eliminate this inconvenience, according to the present embodiment, when the engine continues to be in a steady operating condition, the equation for calculating the adaptive parameter vector $\hat{\theta}$ is modified such that the adaptive parameter vector $\hat{\theta}$ is converged to an initial value thereof, and at the same time, the initial value is set such that the ability of compensating for engine dynamic characteristics can be exhibited to a proper extent by the adaptive control when the engine is in a steady operating condition. Expect for this, the present embodiment is substantially identical in construction with the first embodiment.

In the present embodiment, the equation (6) is transformed into the sum of the initial value $\hat{\theta}(0)$ of the adaptive parameter vector and an updating component $d\hat{\theta}(k)$, as expressed by the following equation (35):

$$\hat{\theta}(k)=\hat{\theta}(0)+d\hat{\theta}(k) \quad (35)$$

and at the same time the updating component $d\hat{\theta}(k)$ is calculated by the following equation (36):

$$\begin{aligned} d\hat{\theta}(k) &= \delta d\hat{\theta}(k-1) + \Gamma(k-1)\zeta(k-d)e*(k) \\ &= \delta d\hat{\theta}(k-1) + Q(k)eid(k) \\ &= \delta^{k-1}Q(1)eid(1) + \delta^{k-2}Q(2)eid(2) + \cdots + \\ &\quad \delta Q(k-1)eid(k-1) + Q(k)eid(k) \end{aligned}$$

wherein $\delta$ represents a forgetting factor vector set by the following equation (37):

$$\delta=[Db_0, Dr_1, Dr_2, \ldots, Dr_{m+d-1}, Ds_0, \ldots, Ds_{n-1},]=Db_0, Dr_1, Dr_2, Dr_3, Ds_0] \quad (37)$$

wherein the second equation is obtained in the case where m=n=1 and d=3 hold. The equations (35) and (36) can be embodied as an adaptive parameter-adjusting section as shown in FIG. 13B. In the figure, B71 and B75 represent multipliers, B72 and B76 adders, and B73 a delay block for delaying the signal by one sampling period.

The updating component $d\hat{\theta}(k)$ is expanded into the third equation of the equation (36), and if this third equation is applied to the equation (35), the following equation (38) is obtained:

$$\hat{\theta}(k)=\hat{\theta}(0)+\delta^{k-1}Q(1)eid(1)+\delta^{k-2}Q(2)eid(2)+\ldots+\delta Q(k-1)eid(k-1)+Q(k)eid(k) \quad (38)$$

Comparison of the equation (38) with the equation (32) shows that the equation (37) for calculating the adaptive parameter vector according to the present embodiment is different from the equation (32) in that the initial value $\hat{\theta}(0)$ of the adaptive parameter vector of the former is not multiplied by the forgetting factor vector $\delta$. More specifically, the second embodiment using the equation (32) may be considered to be equivalent to a case where in the third embodiment using the equation (38), the initial value $\hat{\theta}(0)$ is also multiplied by the forgetting factor.

Elements $Db_0, Dr_1, Dr_2, \ldots, Ds_0$, etc. of the forgetting factor $\delta$ are set to values larger than 0 but smaller than 1. It is preferable, however, that the element $Db_0$ alone is set to 1 so as to set the steady error of the adaptive control to zero irrespective of the setting of the initial value $\hat{\theta}(0)$. Even if $Db_0=1$ holds, no drift of the adaptive parameter vector $\hat{\theta}$ occurs for the same reason that no drift of the same occurs even if the element $Sb_0=1$ holds in the equation (31) of the second embodiment.

The elements $Dr_1, Dr_2, \ldots, Ds_0$, etc. other than the element $Db_0$ of the forgetting factor vector $\delta$ may be all set to an identical value D (0<D<1, e.g. within a range of 0.95 to 0.99) without causing any disadvantageous effects on the control performance. Therefore, it is preferred that the forgetting factor vector $\delta=[1, D, D, \ldots, D]$ holds.

As described above, according to the present embodiment, the adaptive parameter vector $\hat{\theta}$ is calculated by using the equation (35) (i.e. the equation (38)) by employing the forgetting factor vector $\delta$. As a result, when the engine continues to be in a steady operating condition, the adaptive parameter vector $\hat{\theta}$ is converged to a value close to the initial value $\hat{\theta}(0)$. Therefore, by setting the initial value $\hat{\theta}(0)$ to a suitable value, it is possible to maintain excellent dynamic characteristic-compensating ability of the adaptive control while preventing the adaptive parameter vector $\hat{\theta}$ from drifting, even when the engine continues to be in a steady operating condition.

It should be noted that even if some of the elements $Dr_1, Dr_2, \ldots, Ds_0$, etc. other than the element $Db_0$ of the forgetting factor vector $\delta$ are set to 1 so as to inhibit its forgetting function, it is possible to more effectively prevent the adaptive parameter vector $\hat{\theta}$ from drifting than in the case of using the equation (6) in which no multiplication by the forgetting factor $\delta$ is carried out.

In the present embodiment, the STR controller appearing in FIG. 5 corresponds to the adaptive controller, the adaptive parameter-adjusting mechanism to the adaptive parameter vector-adjusting means, and the elements of the forgetting factor vector $\delta$ to predetermined coefficients.

The above described embodiments are provided only by way of example, but by no means intended to limit the invention, and various changes and modifications thereto can be made without departing from the spirit and scope of the invention. For instance, although in the above described embodiments, the adaptive controller is designed such that it is adapted to the dead time d=3, and the sampling timing of the input vector $\zeta$ to the adaptive parameter-adjusting mechanism is set to a period corresponding to an actual dead time longer than the dead time d, this is not limitative, but the adaptive controller may be designed such that it is adapted to the dead time d=2, and the sampling timing of the input vector $\zeta$ to the adaptive parameter-adjusting mechanism may be set to a period corresponding to an actual dead time longer than the dead time d=2.

Further, the invention is applicable to a control system using an adaptive controller in which any lowering of orders of terms of equations used in calculating adaptive parameters is not applied, e.g. a control system in which the adaptive controller is adapted to dead time d=2, and the sampling period of the input vector $\zeta$ of the adaptive parameter-adjusting mechanism is set to a period corresponding to d=2.

Still further, although in the above embodiments, as the manipulated variable of the adaptive control, the correction coefficient KSTR for correcting the basic fuel amount TIMF corresponding to an amount of intake air supplied to the engine is used, this is not limitative, but the fuel injection period TOUT may be directly calculated by the adaptive control. However, if the correction coefficient KSTR is employed as the manipulated variable, the value range of the manipulated variable that can be assumed is more limited, compared with the case of setting the fuel injection period TOUT to the manipulated variable, whereby it is possible to achieve more stable adaptive control.

Further, the plant to be controlled is not limited to an internal combustion engine, but it may be a process of manufacturing a chemical product, for instance. In such a case, the physical quantity to be detected is e.g. a flow rate of a fluid, concentration of a substance, or the like, and the manipulated variable is e.g. a degree of opening of a control valve.

What is claimed is:

1. In a control system for a plant, including detection means for detecting an output from said plant, an adaptive controller for controlling a manipulated variable applied to control of said plant in a manner such that an output from said detection means becomes equal to a desired value, and adaptive parameter vector-adjusting means for adjusting an adaptive parameter vector used by said adaptive controller, the improvement wherein:

said adaptive parameter vector-adjusting means is constructed such that an updating component for updating said adaptive parameter vector is added to an initial value of said adaptive parameter vector, said adaptive parameter vector-adjusting means updating said adaptive parameter vector by multiplying at least part of preceding values of said updating component by a predetermined coefficient which is larger than 0 but smaller than 1.

2. A control system as claimed in claim 1, wherein said adaptive parameter vector-adjusting means does not multiply said initial value of said adaptive parameter vector by said predetermined value.

3. A control system as claimed in claim 1, wherein said adaptive parameter vector-adjusting means multiplies said initial value of said adaptive parameter vector by said predetermined value.

4. A control system as claimed in any of claims 1 to 3, wherein said adaptive parameter vector-adjusting means does not multiply an element of said adaptive parameter vector which is applied as a divisor term for determining said manipulated variable, by said predetermined coefficient.

5. A control system as claimed in claim 4, wherein said adaptive parameter vector-adjusting means sets said element of said adaptive parameter vector to 1.

6. A control system as claimed in any of claims 1 to 3, wherein said adaptive parameter vector-adjusting means sets elements of said predetermined coefficient to respective predetermined values larger than 0 but smaller than 1, respectively.

7. A control system as claimed in any of claims 1 to 3, wherein said adaptive parameter vector-adjusting means sets elements of said predetermined coefficient to an identical predetermined value larger than 0 but smaller than 1.

8. A control system according to any of claims 1 to 3, wherein said plant is an internal combustion engine having an exhaust system, said detection means being air-fuel ratio-detecting means arranged in said exhaust system, for detecting an air-fuel ratio of an air-fuel mixture supplied to said engine, said desired value being a desired air-fuel ratio of said air-fuel mixture, said manipulated variable being an amount of fuel to be supplied to said engine.

9. A control system according to claim 8, wherein said manipulated variable is calculated as a correction coefficient for correcting a basic fuel amount corresponding to an amount of intake air supplied to said engine.

* * * * *